(12) United States Patent  (10) Patent No.: US 9,118,590 B2
Rabie et al.  (45) Date of Patent: *Aug. 25, 2015

(54) VLAN SUPPORT OF DIFFERENTIATED SERVICES

(71) Applicant: RPX CLEARINGHOUSE LLC, San Francisco, CA (US)

(72) Inventors: Sameh Rabie, Kanata (CA); Osama Aboul-Magd, Kanata (CA); Dinesh Mohan, Kanata (CA)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 13/848,578

(22) Filed: Mar. 21, 2013

(65) Prior Publication Data

US 2013/0315244 A1  Nov. 28, 2013

Related U.S. Application Data

(63) Continuation of application No. 11/169,718, filed on Jun. 30, 2005, now Pat. No. 8,422,500.

(60) Provisional application No. 60/584,481, filed on Jul. 2, 2004.

(51) Int. Cl.
*H04L 12/725*  (2013.01)
*H04L 12/46*  (2006.01)
(Continued)

(52) U.S. Cl.
CPC ............ *H04L 45/30* (2013.01); *H04L 12/4645* (2013.01); *H04L 45/04* (2013.01);
(Continued)

(58) Field of Classification Search
None
See application file for complete search history.

(56) References Cited

U.S. PATENT DOCUMENTS 5,485,455 A  1/1996  Dobbins et al.
6,151,324 A  11/2000  Belser et al.
(Continued)

FOREIGN PATENT DOCUMENTS

EP  1158724  11/2001
EP  1 538 786 A2  6/2005
(Continued)

OTHER PUBLICATIONS

ITU-TG.8031 (ITU-TG.8031/Y.1342, "Ethernet Protection Switching", Jun. 2006), 52 pages.
(Continued)

*Primary Examiner* — Andrew Chriss
*Assistant Examiner* — Joshua A Kading
(74) *Attorney, Agent, or Firm* — Pearne & Gordon LLP

(57) ABSTRACT

The two types of virtual local area networks (VLANs) may be defined: p-bits-Inferred-scheduling class VLAN (p-VLAN); and VLAN-10-Only-Inferred-scheduling class VLANs (v-VLAN). As such, upon receipt of an Ethernet frame, the type of VLAN associated with the Ethernet frame may be determined. The type of VLAN provides the receiving node with an indication of a method of determining a scheduling class. A p-VLAN supports multiple scheduling classes. For a p-VLAN, the scheduling class and drop precedence for the received Ethernet frame may be determined based on a "service map" that describes the relationship between the p-bits and forwarding treatment. A v-VLAN supports a single scheduling class. As such, the scheduling class for a received Ethernet frame may be determined based on the VLAN-10 of the received Ethernet frame. The described VLAN QoS information may be configured or signaled across the network. Advantageously, the methods may be applied in connectionless, connection-oriented and path-oriented Ethernet networks.

21 Claims, 28 Drawing Sheets

(51) Int. Cl.
*H04L 12/715* (2013.01)
*H04L 12/723* (2013.01)
*H04L 12/801* (2013.01)
*H04L 12/857* (2013.01)
*H04L 12/823* (2013.01)
*H04L 12/851* (2013.01)

(52) U.S. Cl.
CPC ............... *H04L 45/50* (2013.01); *H04L 47/10* (2013.01); *H04L 47/2408* (2013.01); *H04L 47/2433* (2013.01); *H04L 47/2491* (2013.01); *H04L 47/32* (2013.01)

(56) References Cited

U.S. PATENT DOCUMENTS

| | | |
|---|---|---|
| 6,449,279 B1 | 9/2002 | Belser et al. |
| 6,515,993 B1 | 2/2003 | Williams et al. |
| 6,563,832 B1 | 5/2003 | Stuart et al. |
| 6,754,211 B1 | 6/2004 | Brown |
| 6,788,681 B1 | 9/2004 | Hurren et al. |
| 6,789,121 B2 | 9/2004 | Lamberton et al. |
| 6,839,327 B1 | 1/2005 | Zavalkovsky et al. |
| 6,937,576 B1 * | 8/2005 | Di Benedetto et al. ....... 370/256 |
| 7,075,926 B2 | 7/2006 | Cathey et al. |
| 7,301,949 B2 | 11/2007 | Eriksson |
| 7,352,770 B1 | 4/2008 | Yong et al. |
| 7,394,758 B2 | 7/2008 | Gonda |
| 7,693,149 B2 | 4/2010 | Cathey et al. |
| 7,715,379 B2 | 5/2010 | Gonda |
| 7,746,768 B2 | 6/2010 | Gonda |
| 7,782,860 B2 | 8/2010 | Eriksson |
| 7,916,746 B2 | 3/2011 | Yong et al. |
| 7,920,561 B2 | 4/2011 | Gonda |
| 2001/0046229 A1 | 11/2001 | Clear et al. |
| 2001/0053150 A1 | 12/2001 | Clear et al. |
| 2002/0009090 A1 | 1/2002 | Kalkunte et al. |
| 2002/0016856 A1 | 2/2002 | Tallegas et al. |
| 2002/0031142 A1 | 3/2002 | Metin et al. |
| 2002/0064128 A1 | 5/2002 | Hughes et al. |
| 2002/0085560 A1 | 7/2002 | Cathey et al. |
| 2003/0043736 A1 | 3/2003 | Gonda |
| 2003/0067928 A1 | 4/2003 | Gonda |
| 2003/0126286 A1 | 7/2003 | Lee |
| 2003/0152075 A1 | 8/2003 | Hawthorne et al. |
| 2004/0037279 A1 | 2/2004 | Zelig et al. |
| 2004/0042454 A1 | 3/2004 | Zabihi et al. |
| 2004/0081171 A1 | 4/2004 | Finn |
| 2004/0081180 A1 | 4/2004 | De Silva et al. |
| 2004/0081203 A1 | 4/2004 | Sodder et al. |
| 2004/0133619 A1 | 7/2004 | Zelig et al. |
| 2004/0202156 A1 | 10/2004 | Fonden et al. |
| 2004/0221051 A1 | 11/2004 | Liong et al. |
| 2005/0013297 A1 | 1/2005 | Eriksson |
| 2005/0094577 A1 | 5/2005 | Ashwood-Smith |
| 2005/0220096 A1 | 10/2005 | Friskney et al. |
| 2005/0265329 A1 | 12/2005 | Havala et al. |
| 2006/0029032 A1 | 2/2006 | Allan et al. |
| 2006/0251069 A1 | 11/2006 | Cathey et al. |
| 2008/0037559 A1 | 2/2008 | Eriksson |
| 2008/0175265 A1 | 7/2008 | Yonge et al. |
| 2008/0259786 A1 | 10/2008 | Gonda |
| 2010/0177775 A1 | 7/2010 | Gonda |

FOREIGN PATENT DOCUMENTS

| | | |
|---|---|---|
| JP | 2002185473 | 6/2002 |
| JP | 2002344476 A | 11/2002 |
| JP | 2003046545 | 2/2003 |
| JP | 2003198610 | 7/2003 |
| WO | 03021858 | 3/2003 |
| WO | 03027807 | 4/2003 |
| WO | 2005008971 A1 | 1/2005 |
| WO | 2005099183 A1 | 10/2005 |

OTHER PUBLICATIONS

Marc Lasserre, Vach Kompella (Editors): "Virtual Private LAN Services over MPLS; draft-ietf-lvpn-vpls-ldp-07.txt", IETF Standard-Working-Draft, Internet Engineering Task Force, IETF, CH, vol. l2vpn, No. 7, Jul. 1, 2005, XP015041095, ISSN: 0000-0004, pp. 1-25.

Bottorff P. et al. ("Provider Backbone Bridging Networks", Seminar on Metro Ethernet Technologies, Broadband Networking, Technology Department, Universitat Pompeu Fabra, Oct. 15, 2004, pp. 1-72, URL: http://www.tecn.upf.es/~_dsala/events/MEFoct04.html Retrieved from the Internet on Nov. 7, 2006.

Chirurvolu et al., "Issues and Approaches on Extending Ethernet Beyond LANs", Ethernet Transport Over Wide Area Networks, Communications Magazine, IEEE, vol. 42, Issue 3, Mar. 2004, pp. 80-86.

David Allan and Nigel Bragg, Nortel, Alan McGuire and Andy Reid, BT, "Ethernet as Carrier Transport Infrastructure", IEEE Communications Magazine, Feb. 2006, pp. 134-140.

"Adding Scale, QoS and Operational Simplicity to Ethernet", Nortel Networks, Date: At least as early as Jun. 29, 2006, pp. 1-8.

Hamid Ould-Brahim, Frank Neil, Frank Palermo, Vasile Radoaca, Nortel Networks, Juan Manuel Ramos-Gurrion, Paul Lebel, Bell Canada: "Service Requirements for Ethernet based L2VPNs; draft-ouldbrahim-ethernet-l2vpn-requirements-00.txt", IETF Standard-Working-Draft, Internet Engineering Task Force, IETF, CH, Jul. 1, 2001, XP015033591, ISSN: 0000-0004, pp. 1-9.

Arnold Sodder Tenor Networks: "Virtual Hierarchical LAN Services; draft-sodder-ppvpn-vhls-00.txt", 20021001, Oct. 1, 2002, XP015035540, ISSN: 0000-0004, pp. 1-12.

"History of VPLS at IETF; 12Nov02-VPLS-history", IEEE Draft; 12NOV02-VPLS-History, IEEE-SA, Piscataway, NJ USA, vol. 802. 1, Jan. 9, 2003, pp. 1-16, XP017640064, [retrieved on Jan. 9, 2003].

Ohashi, "How to avoid trouble if switch LAN (second volume) Be careful of host protocols", Nikkei Communications, No. 224, Jun. 17, 1996, p. 124-129.

Le Faucheur, et al., RFC 3270: "Multi-Protocol Label Switching Support of Differentiated Services", May 2002, The Internet Society.

CCAMP Working Group T Kawakami G Velev Matsushita N Ogashiwa Jaist H Ogawa CRL: "Method to Set Up LSP using VLAN Tag Switching" IETF Standard-Working-Draft, Internet Engineering Task Force, Jun. 2003.

RFC 2474—K Nichols, et al., "Definition of the Differentiated Services Field (DS Field) in the IPv4 and IPv6 Headers", The Internet Society, Dec. 1998.

RFC 3246—B Davie, et al., "An Expedited Forwarding PHB (Per-Hop Behaviour)", The Internet Society, Mar. 2002.

RFC 3032—E. Rosen, et al., "MPLS Label Stack Encoding", The Internet Society, Jan. 2001.

RFC 3031—E Rosen et al., "Multiprotocol Label Switching Architectures", The Internet Society, Jan. 2001.

RFC 2597—J. Heinanen et al., "Assured Forwarding PHB Group", The Internet Society, Jun. 1999.

RFC 2475—S. Blake, et al., "An Architecture for Differentiated Services", The Internet Society, Dec. 1998.

RFC 3270—Le Faucheur, et al., "Multi-Protocol Label Switching (MPLS) Support of Differentiated Services", The Internet Society, May 2002.

IEEE P802.1ad/D4.0, Virtual Bridged Local Area Networks—Amendment 4: Provider Bridges—Draft Standard for Local and Metropolitan Area Networks, IETF, Feb. 9, 2005.

* cited by examiner

1600 →

| p-BITS | E-PHB |
|---|---|
| 111 | E-EF |
| 110 | E-AF41 |
| 101 | E-AF42 |
| 100 | E-AF43 |
| 011 | E-AF21 |
| 010 | E-AF22 |
| 001 | CS-2 |
| 000 | E-DF |

| E-PHB | E-PSC | SCHEDULING Q | DP / COLOR |
|---|---|---|---|
| E-EF | E-EF | 1 | LOW / GREEN |
| E-AF41 | E-AF4 | 2 | LOW / GREEN |
| E-AF42 | E-AF4 | 2 | MED / YELLOW |
| E-AF43 | E-AF4 | 2 | HIGH / RED |
| E-AF21 | E-AF2 | 3 | LOW / GREEN |
| E-AF22 | E-AF2 | 3 | MED / YELLOW |
| CS-2 | CS-2 | 4 | LOW / GREEN |
| E-DF | E-DF | 5 | LOW / GREEN |

| p-BITS | E-PHB |
|---|---|
| 111 | E-AF41 |
| 110 | E-AF42 |
| 101 | E-AF31 |
| 100 | E-AF32 |
| 011 | E-AF21 |
| 010 | E-AF22 |
| 001 | E-AF11 |
| 000 | E-AF12 |

Fig. 17B 1700B

| p-BITS | E-PHB |
|---|---|
| 111 | E-EF |
| 110 | E-AF41 |
| 101 | E-AF42 |
| 100 | E-AF31 |
| 011 | E-AF32 |
| 010 | E-AF2x |
| 001 | CS-1 |
| 000 | E-DF |

Fig. 17C 1702C

| p-BITS | E-PHB |
|---|---|
| 111 | E-EF |
| 110 | E-AF41 |
| 101 | E-AF42 |
| 100 | E-AF43 |
| 011 | E-AF21 |
| 010 | E-AF22 |
| 001 | E-AF23 |
| 000 | E-DF |

Fig. 17D 1702D

| p-BITS | E-PHB |
|---|---|
| 111 | CS7 |
| 110 | CS6 |
| 101 | CS5 |
| 100 | CS4 |
| 011 | CS3 |
| 010 | CS2 |
| 001 | CS1 |
| 000 | CS0 |

| p-BITS | DP/COLOR |
|---|---|
| 000 | LOW/GREEN |
| 001 | LOW/GREEN |
| 010 | MED/YELLOW |
| 011 | HIGH/RED |
| 000 | LOW/GREEN |
| 000 | LOW/GREEN |

| p-BITS | DP/COLOR | E-PHB | SC |
|---|---|---|---|
| 000 | LOW/GREEN | E-EF | E-EF |
| 001 | LOW/GREEN | E-AFn1 | E-AFn |
| 010 | MED/YELLOW | E-AFn2 | E-AFn |
| 011 | HIGH/RED | E-AFn3 | E-AFn |
| 000 | LOW/GREEN | E-CS-n | E-CS-n |
| 000 | LOW/GREEN | E-DF | E-DF |

| p-BITS | E-PHB |
|---|---|
| 001 | E-AF41 |
| 010 | E-AF42 |
| 011 | E-AF43 |

| p-BITS | E-PHB |
|---|---|
| 000 | CS-4 |

| p-BITS | E-PHB |
|---|---|
| 000 | E-EF |

| p-BITS | E-PHB |
|---|---|
| 000 | E-DF |

VLAN SUPPORT OF DIFFERENTIATED SERVICES

CROSS REFERENCE TO RELATED APPLICATIONS

The present application claims the benefit of prior provisional application Ser. No. 60/584,481, filed Jul. 2, 2004, which is hereby incorporated herein by reference in its entirety. The present application is a continuation of U.S. patent application Ser. No. 11/169,718 filed Jun. 30, 2005, which is hereby incorporated herein by reference in its entirety.

FIELD OF THE INVENTION

The present invention relates to differential forwarding in address-based carrier networks. In particular, the present invention relates to virtual local area networks (VLANs) and, more particularly, to support of differentiated services in VLANs through the use of differentiable types of VLANs.

BACKGROUND

For many years now, telecommunications carriers have been deploying packet-switched networks in place of, or overlaid upon, circuit-switched networks for reasons of efficiency and economy. Packet-switched networks, such as Internet Protocol (IP) or Ethernet networks, are intrinsically connectionless in nature and, as a result, suffer from Quality of Service (QoS) problems. Customers value services which are guaranteed in terms of bandwidth and QoS.

Carriers may use Multi-Protocol Label Switching (MPLS) over a layer 2 network to create connection-oriented label switched paths (or tunnels) across the intrinsically connectionless network and, thereby, provide guaranteed QoS and bandwidth services to customers. However, MPLS is a relatively unstable and complex standard and carriers may desire an alternative.

It is desired to use Ethernet switches in carriers' networks. Use of Ethernet switches in carriers' networks is expected to have advantages including interoperability (mappings between Ethernet and other frame/packet/cell data structures such as IP, Frame Relay and Asynchronous Transfer Mode are well known) and economy (Ethernet switches are relatively inexpensive when, for example, compared to IP routers). The use of Ethernet switches in carriers' networks is also expected to provide a distinct advantage in that Ethernet is the principal technology used by enterprises that require wide area network service from a carrier.

However, the behavior of conventional switched Ethernet networks is incompatible with carriers' requirements for providing guaranteed services to customers. Carriers require a network to be meshed for load balancing and resiliency, i.e., there must be multiple paths across the carrier network, and require a network to include an ability to perform traffic engineering, i.e., the ability of a network operator to control the provision of explicitly-routed, variable bandwidth connections (or tunnels) through which traffic may be directed. Such a required network is expected to provide operators significant flexibility in that the physical network build is not obliged to correspond to the offered load and, therefore, the physical network build is tolerant of changing usage patterns without requiring on-going physical modifications.

In contrast, conventional Ethernet networks must be simply-connected, i.e., there must be one, and only one, logical path choice between each and every node of the network. As a consequence, conventional Ethernet networks do not have support for network-wide load balancing, suffer from resiliency problems and cannot support traffic engineering. Further, the impact of a single failure, with respect to the overall load carried, can be significant.

Spanning tree protocols are known. Such spanning tree protocols enable a physically meshed Ethernet network to be logically transformed into a simply-connected network by detecting physical loops and logically disabling connections to break up any loops that may arise. Certain spanning tree protocols are known to detect failure of a physical connection (thereby partitioning the fully-connected network) and automatically restore one or more previously-disabled physical connections so as to re-connect the network. This provides a degree of resiliency. However, carriers need to plan their network traffic routes to achieve much higher resiliency, flexibility and efficiency than known spanning tree protocols can achieve.

This level of routing capability is best achieved by segregating the traffic into connections whose routes are determined as part of this planning process.

Recently, the Institute of Electrical and Electronics Engineers (IEEE) has introduced a user priority indication capability that enables the definition of up to eight service classes, also known as Classes of Service (CoS), which allows some segregation of traffic. A set of Ethernet frames that have the same user priority indication may receive the same level of performance within the service provider's network, where level of performance is often measured in terms of frame loss ratio, frame delay and frame delay variation.

A standard, known as IEEE 802.1Q, defines an architecture for a general purpose Virtual Local Area Network (VLAN) that may be implemented within an enterprise network as a point-to-point connection, a point-to-multipoint connection or a multipoint-to-multipoint connection. IEEE 802.10 describes a four-byte extension to Ethernet frame headers, where the four-byte extension is known as an IEEE 802.1Q tag. This tag includes a number of fields, including a 12-bit VLAN-ID field (VLAN tag field} and a three-bit "user priority" field used to signal compliant devices. These three bits (normally referred to as the "p-bits") provide for eight possible values, which match those used in the known IEEE 802.1p user priority field.

A single Ethernet VLAN has a capability to support the transmission of Ethernet frames requiring different classes of service (up to eight). This capability differentiates Ethernet VLANs from connections defined by other technologies such as Frame Relay (FR) or Asynchronous Transfer Mode (ATM}.

The Internet Engineering Task Force (IETF) has published an Internet Draft document referred to as draft-kawakami-mpls-lsp-vlan-00 dot txt" (currently available at www dot ietf dot org). The Internet Draft document describes the use of VLAN tags for label switching across Ethernet networks in a manner similar to the use of MPLS labels for label switching over MPLS networks; VLAN tags are used as labels to mark traffic at an ingress point of a label switched path (LSP) as belonging to a Layer 2 tunnel and VLAN-aware Ethernet switches in the network act as a VLAN label switched routers.

Connections are formed using one or more LSPs. Intermediate nodes along a given connection may optionally swap an inbound label to a different outbound label. In this manner, the VLAN tag has meaning specific to any given local node and the ability to reuse VLAN tags solves some of the scalability issues of 802.1q.

However, one problem with the method proposed in draft-kawakami-mpls-lsp-vlan-00 dot txt is that only a maximum of 4094 unique VLAN tags are definable in 802.1q compliant equipment. This maximum limits the flexibility and increases the complexity of provisioning connections across the network. Another problem is that connections may not easily be re-routed once provisioned without, in general, creating transitory loops.

Another problem is that since the Frame Check Sequence (FCS) in Ethernet frames is computed over both the payload and header portions of the frame, every time a VLAN tag (i.e., a label) is swapped at the ingress or egress point of a LSP, the FCS needs to be recomputed since the VLAN tag will have changed. This requires performing a computation function over the entire Ethernet frame. Moreover, during the interval from when the original FCS is removed and the new FCS added, the frame is vulnerable to corruption without the protection of any FCS.

Yet another problem with the "label-swapping" approach proposed in draft-kawakami-mpls-lsp-vlan-00 dot txt is that it requires a "chain of correctness", in that forwarding relies on each local label-forwarded link on the LSP being correct. This should be contrasted with conventional Ethernet which uses globally unique address information to perform forwarding. As the LSP labels are not globally unique per conventional Ethernet, it is possible for a forwarding fault, in performing label translation, to be concealed if a value is incorrectly mapped to another value that is in use. More importantly, from a practical perspective, "label-swapping" behavior represents a significant change from both conventional Ethernet switch functionality and current telecommunications standards.

The IP differentiated service architecture, "DiffServ" (see Blake, S., et. al., "An Architecture for Differentiated Services", IETF Request for Comments (RFC) 2475, December 1998, which may be found at http://www.ietf.org/ www dot ietf dot org and is hereby incorporated herein by reference), has now been accepted by the industry as a scalable solution for introducing classes of service for providing QoS guarantees in packet networks.

In a DiffServ domain, all the IP packets crossing a link and requiring the same DiffServ behavior are said to constitute a Behavior Aggregate (BA). At the ingress node of the DiffServ domain, the packets are classified and marked with a DiffServ Code Point (DSCP) which corresponds to the Behavior Aggregate of the packet. At each transit node, the DSCP is used to select a Per Hop Behavior (PHB) that determines how each packet is treated at the transit node. The DiffServ terms that describe how the packet is treated include scheduling treatment and drop precedence.

Le Faucheur. F., et al, "Multi-Protocol Label Switching (MPLS) Support of Differentiated Services", IETF RFC 3270, May 2002 (which may be found at www.ietf.org and is hereby incorporated herein by reference) describes different MPLS LSP types: EXP-Inferred-service class LSP (E-LSP); and Labei-Only-Inferred-service class LSP (L-LSP). MPLS EXP bits are found in the MPLS shim header. The MPLS shim header is the header that is placed in packets that carry label information. The MPLS shim header is defined in IETF RFC 3032. The manner in which E-LSPs and L-LSPs can be used for supporting IP DiffServ classes is also described. RFC 3270 builds on earlier IETF standards concerning IP DiffServ and MPLS technology.

An E-LSP may support up to eight service classes in one Label Switched Path (LSP), determined through the mapping of the EXP bits to DiffServ PHBs. The mapping can be either configured or signaled during the LSP establishment. The L-LSP supports a single scheduling class determined by signaling the association between the LSP and the DiffServ scheduling class, and up to three drop precedence (DP) determined by a fixed mapping of the EXP bits to DP. Both the E-LSP and L-LSP may be established using either a connectionless protocol (such as LOP), or a connection-oriented protocol (such as RSVP-TE). In the latter case, bandwidth reservation and admission control can be optionally specified per LSP for stronger QoS guarantees. The combination of MPLS and DiffServ methods yields many benefits, including reuse of the DiffServ methods/standards and support of multiple QoS options, which are applicable to both connection-oriented and connectionless MPLS networks.

Clearly, support of DiffServ is desirable in Ethernet VLANs. It can yield the same benefits realized in MPLS networks, including differentiated traffic treatment, and support of multiple service classes with quality of service guarantees.

Recent IEEE discussions describe a table-based approach for specifying the mapping of p-bits to forwarding classes and drop precedence (see IEEE P802.1ad/04.0, "Virtual Bridged Local Area Networks-Amendment 4: Provider Bridges", Feb. 8, 2005). Solutions providing support of multiple QoS in Ethernet VLANs have been implemented by some switch vendors.

However, the solutions are known to be ad hoc and proprietary. The solutions either provide limited QoS support, implement simple class-based queuing, without support for drop precedence, or support a limited table-based approach for specifying the mapping of Ethernet VLANs p-bits to scheduling queues and drop precedence. Furthermore, these solutions do not provide support for Ethernet "connections" that can be assigned a specified network path, a forwarding treatment and, optionally, bandwidth reservation.

SUMMARY

New methods introduced for the specification and support of multiple per hop behaviors in a network are based on concepts in specifications of Ethernet VLANs, IP Differentiated Services and MPLS QoS. Two types of VLANs are defined: a single—scheduling class VLAN; and a multiple scheduling class VLAN. Both types of VLANs may provide single drop precedence support or multiple drop precedence support for the Ethernet frames. Upon receipt of an Ethernet frame specifying an identity of a VLAN, a network node may be required to determined a type of VLAN for the identified VLAN to forward the frame appropriately.

By providing flexible methods for the specification and support of multiple scheduling classes and forwarding treatments for, for example, Ethernet VLANs, several benefits may be realized compared to current practices. The benefits may include network design flexibility, allowances for tradeoffs between scalability and QoS support, simplified configuration and operations, and standards-based interoperability between Ethernet equipment and between Ethernet equipment and equipment running other protocols such as IP and MPLS.

In accordance with an aspect of the present invention there is provided a method of preparing a network node for forwarding data frames related to a virtual local area network. The method includes defining a service map to include an association between: contents of a user priority field in the header of the data frame; and a frame per hop behavior. The method further includes associating the service map with a particular virtual local area network identification.

In accordance with another aspect of the present invention there is provided a method of handling a received data frame. The method includes determining a value for contents of a virtual local area network identification field in a header of the data frame, where the contents of the virtual local area network identification field identify a given virtual local area network and selecting, based on the value for the contents of the virtual local area network identification field, a previously defined service map, where the service map includes an association between: contents of a user priority field in the header of the data frame; and a frame per hop behavior. The method further includes determining a value for contents of the user priority field in the header of the data frame, determining, based on a mapping in the service map to the value for the contents of the user priority field, a given frame per hop behavior for the data frame and forwarding the data frame based on the given frame per hop behavior. In another aspect of the present invention, a network-connected apparatus is provided that is adapted to carry out this method.

In accordance with a further aspect of the present invention there is provided a method of handling a received data frame. The method includes determining a value for contents of a virtual local area network identification field in a header of the data frame, determining, based on the value for the contents of the virtual local area network identification field, a type of virtual local area network, among a plurality of types, with which the data frame has been associated, determining, based, at least in part, on the type of virtual local area network and the value for the contents of the virtual local area network identification field, a frame scheduling class for the data frame and servicing the data frame based on the given frame scheduling class. In another aspect of the present invention, a network-connected apparatus is provided that is adapted to carry out this method and a computer readable medium is provided for providing instructions to a processor for carrying out this method.

In accordance with a still further aspect of the present invention there is provided a method of handling a received data frame. The method includes determining a value for contents of a user priority field in a header of the data frame, determining, based, at least in part, on the value for the contents of the user priority field, a frame scheduling class for the data frame and servicing the data frame based on the given frame scheduling class. In another aspect of the present invention, a network-connected apparatus is provided that is adapted to carry out this method.

In accordance with still another aspect of the present invention there is provided a method of preparing a network node for forwarding data frames related to a virtual local area network. The method includes defining an association between a frame scheduling class and a particular virtual local area network identification. In another aspect of the present invention, a network-connected apparatus is provided that is adapted to carry out this method.

In accordance with an even further aspect of the present invention there is provided a method of handling a received data frame. The method includes determining a value for contents of a virtual local area network identification field in a header of the data frame, determining, based on the value for the contents of the virtual local area network identification field, a frame scheduling class for the data frame and forwarding the data frame based, at least in part, on the given frame scheduling class. In another aspect of the present invention, a network-connected apparatus is provided that is adapted to carry out this method.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 16A illustrates a first exemplary p-VLAN service map according to an embodiment of the present invention;

FIG. 16B illustrates an exemplary per-hop behavior to scheduling class and forwarding treatment mapping;

FIG. 17A illustrates a second exemplary service map according to an embodiment of the present invention;

FIG. 17B illustrates a third exemplary service map according to an embodiment of the present invention;

FIG. 17C illustrates a fourth exemplary service map according to an embodiment of the present invention;

FIG. 17D illustrates a fifth exemplary service map according to an embodiment of the present invention;

FIG. 19A illustrates a second exemplary p-bit to DiffServ PHB mapping according to an embodiment of the present invention;

FIG. 19B illustrates a third exemplary p-bit to DiffServ PHB mapping according to an embodiment of the present invention;

FIG. 19C illustrates a fourth exemplary p-bit to DiffServ PHB mapping according to an embodiment of the present invention;

FIG. 19D illustrates a fifth exemplary p-bit to DiffServ PHB mapping according to an embodiment of the present invention;

DETAILED DESCRIPTION

Embodiments of the present invention are described below by way of example only. These examples represent the best ways of putting the invention into practice that are currently known to the Applicant although they are not the only ways in which this could be achieved.

Figure 1:
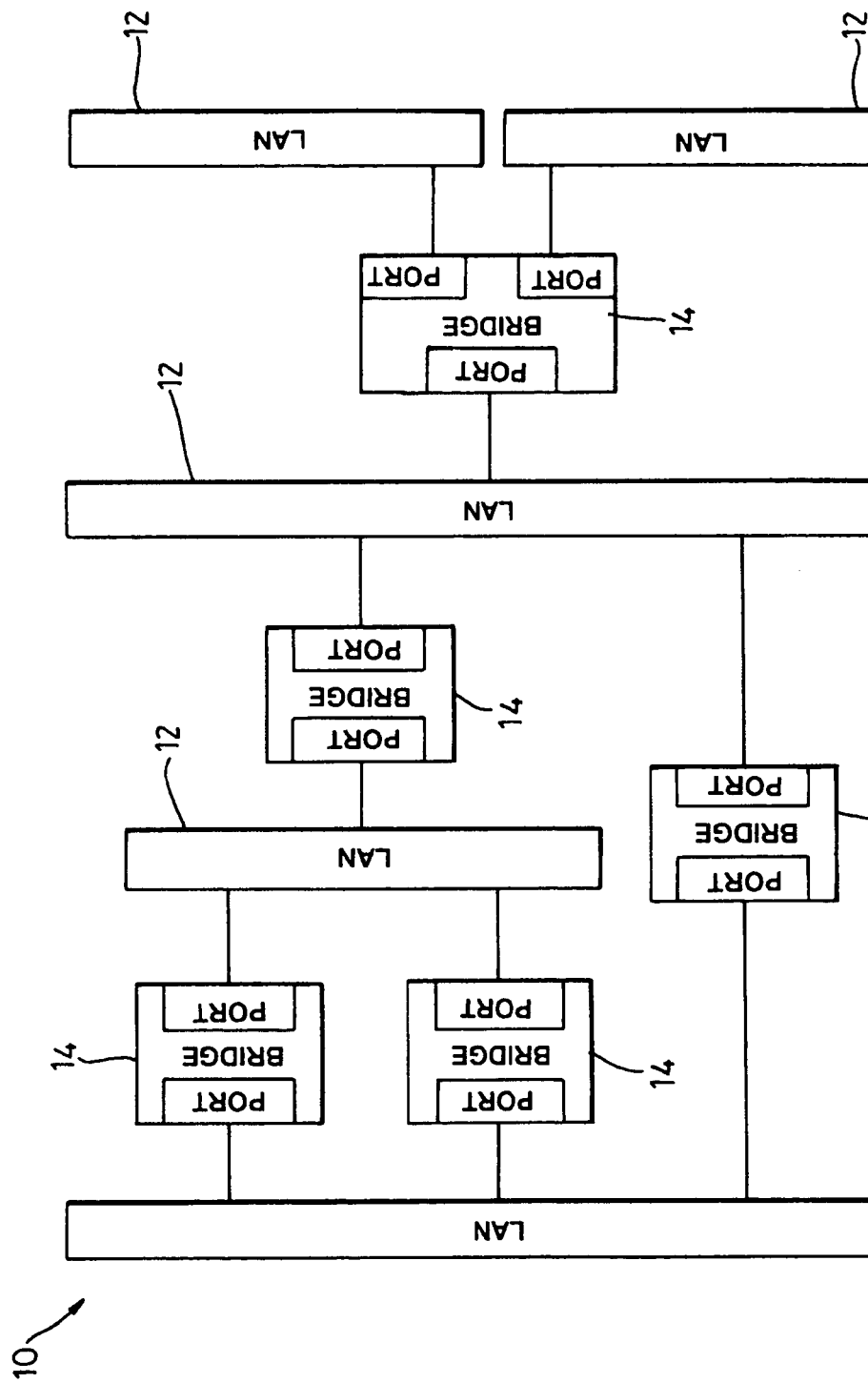
FIG. 1 shows a conventional Virtual Bridged LAN.

Virtual Bridged LANs (or VLANs) are described in the Institute of Electrical and Electronics Engineers (IEEE) standard 802.1q, 2003 Edition. FIG. 1 shows a conventional VLAN 10 split up into a plurality of component LANs 12 and connected via VLAN-aware Media Access Control (MAC) bridges 14. Component LANs 12 are typically provided for different communities of interest, such as users sharing a common server or having common network protocol requirements. Unique identifiers (VLAN tags or VLAN-IDs) may be used to identify each component LAN. Broadcast traffic may be broadcast only within component LANs. This helps to overcome the scalability issues of Ethernet by partitioning the whole of the resources of network 10 into smaller broadcast domains. VLAN tags are used to distinguish between traffic for different component LANs when forwarding traffic on shared links between MAC bridges. However the size of the standard VLAN tag is limited to 12 bits, which, in turn, limits the scale of the network and the number of partitions of component LANs to 4094, where two VLAN tags are reserved with special meaning not for general assignment.

To support guaranteed QoS to customers, requirements include:

1) an at least partially meshed carrier network;
2) an ability to establish explicitly routed connections across the carrier network between any two edge nodes (traffic engineering); and
3) an ability to enforce any bandwidth restrictions and/or forwarding rules applied to the connections.

Figure 2:
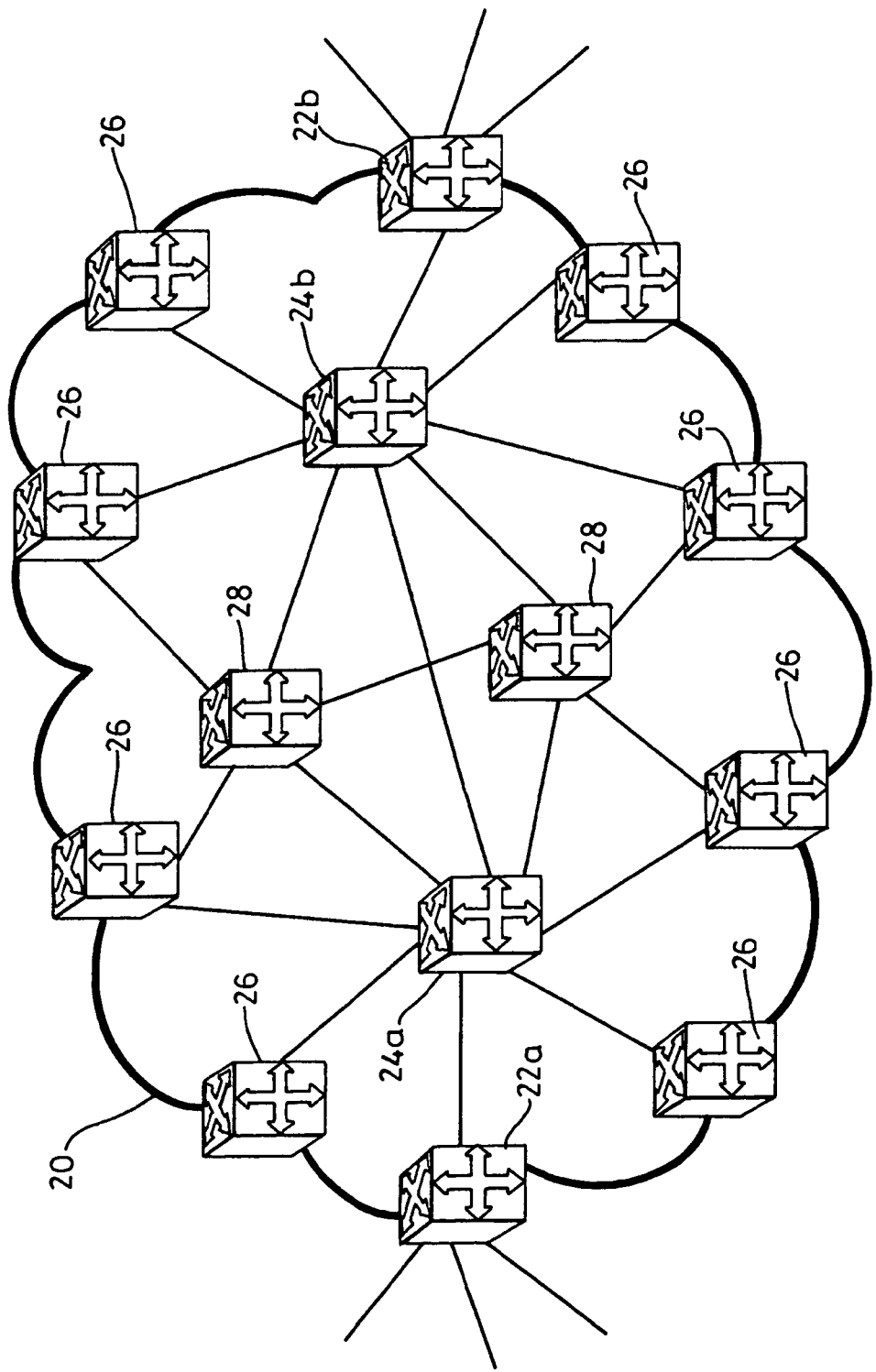
FIG. 2 shows an arrangement of Ethernet switches forming a carrier network according to aspects of the present invention.

FIG. 2 shows an arrangement of Ethernet switches and communications links forming a carrier network according to the present invention. Carrier network cloud comprises Ethernet switches 22a, 22b, 24a, 24b, 26 and 28. Ethernet switches 22a, 22b and 26 are located at the edges of carrier network 20, whereas Ethernet switches 24a, 24b, and 28 are located in the core of carrier network 20.

Communications links (shown as straight lines in FIG. 2) are provided between

Ethernet switches 22a, 22b, 24a, 24b, 26 and 28. These communications links may be, for example, relatively long distance links over optical equipment such as Synchronous Optical NETwork/Synchronous Digital Hierarchy (SONET/SDH) equipment with Ethernet interfaces using a Generic Framing Procedure (GFP) according to ITU-T Recommendation G.7041/Y.1303.

Note that core network switches 24a, 24b and 28 are fully-meshed, i.e., there is a direct communications link connecting each core network switch 24a, 24b and 28 to each other. Edge network switches 22a, 22b and 26 are not fully-meshed but have at least one direct communication link to communications link to a core network switch 24a, 24b or 28. The reader will appreciate that the particular network arrangement described is exemplary. In general, carrier networks may be implemented with virtually any number of Ethernet switches that, according to the present invention, may be connected in a fully-meshed or partially-meshed manner.

Figure 4:
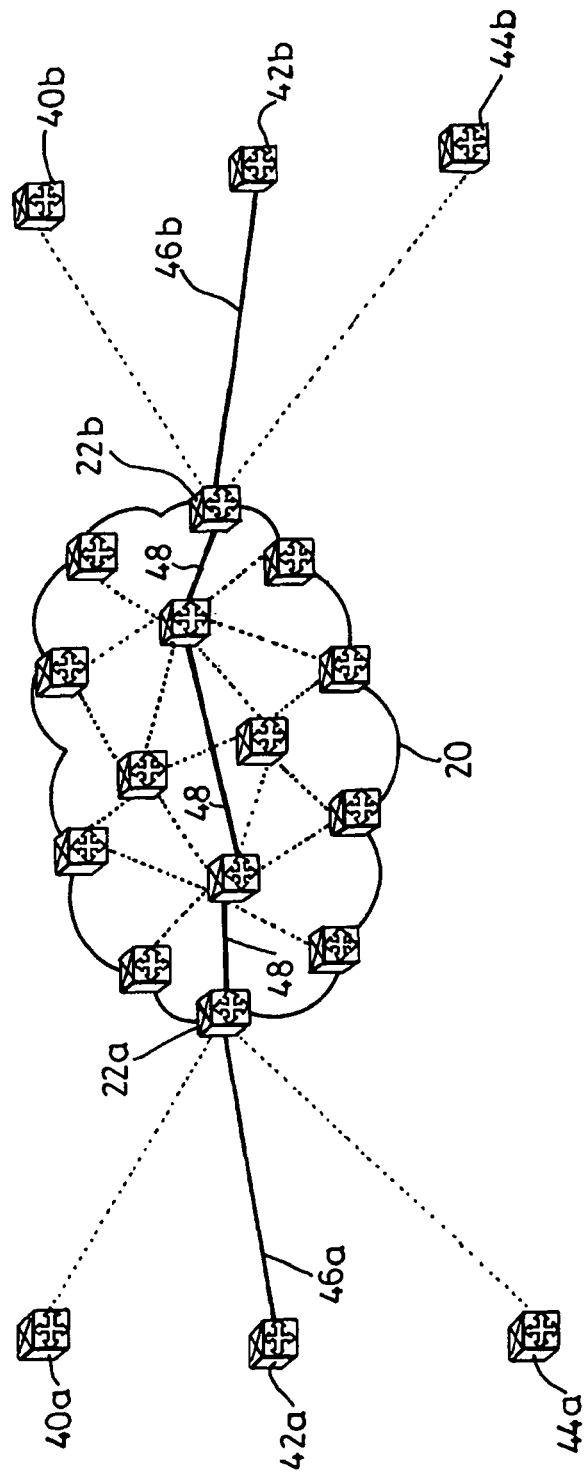
FIG. 4 shows the carrier Ethernet network of FIG. 1 arranged to provide connectivity between customer sites according to aspects of the present invention.

FIG. 4 shows how a carrier Ethernet network may provide connectivity between customer sites according to aspects of the present invention. Three customers having respective pairs of geographically distant Ethernet switches (40a and 40b, 42a and 42b, 44a and 44b) are shown connected to carrier network 20 via edge Ethernet switches 22a and 22b, respectively. The communications links between edge switches 22a and 22b and customer switches 40a, 40b, 42a, 42b, 44a and 44b may be dedicated links, such as T1, E1 leased lines or access links, such as digital Subscriber Lines (DSLs).

Carrier edge switches 22a, 22b (and 26 in FIG. 2) may be logically separated into a single Provider Edge- (PE-) Core and one or more PE-Edge functions. The PE-Edge function may be employed at the ingress/egress point, that is, the point at which customer traffic enters or leaves the provider network, i.e., carrier network 20.

The PE-Core function may be employed to encapsulate incoming Ethernet traffic from the customer using MAC-in-MAC encapsulation (or if desired Pseudo-Wire over MAC encapsulation) and to forward the encapsulated traffic across the carrier network 20. This embodiment is preferred as a mechanism to limit the number of table entries required because only the MAC address space of the carrier network 20 need be recognized, and not the whole of the customer's MAC address space, which could be changed independently. Similarly, the PE-Core function may be employed to deencapsulate (strip) outgoing Ethernet traffic and to forward the stripped traffic on to the customer via the appropriate PE-Edge function. VLAN tags are used to provide customer separation at the logical PE-Core with each different customer site connected to each edge switch having a unique VLAN tag. Stacked VLAN (i.e., VLAN in VLAN encapsulation or Q-in-Q) may be used to protect any VLAN tags used by the customer traffic.

For example, customer switch 42a may send Ethernet traffic over communications link 46a to the logical PE-Edge of edge switch 22a. Logical PE-Core of edge switch 22a encapsulates each Ethernet frame in a further Ethernet frame using the MAC address of edge switch 22a as the source address and the MAC address of the appropriate egress point, in this case, edge switch 22b, as the destination address. The encapsulated traffic is forwarded across a connection established over communications links 48 of carrier network 20 to edge switch 22b.

Connections may be typically trunked in the sense that traffic from multiple customers will be routed through the same connection. Alternatively, those skilled in the art will appreciate that separate connections 48 could be used for each customer. At the PE-Core of edge switch 22b, the original frames are stripped of their encapsulation and sent over communications link 46b via the PE-Edge of edge switch 22b to customer switch 42b.

The reader will appreciate that, in alternative embodiments of the present invention, the logical PE-Edge may be physically separated from the logical PE-Core and may reside at customer premises whereas the PE-Core would preferentially reside at a central office, or Point of Presence (PoP), of the carrier. The reader will also appreciate that other edge switches 26 (FIG. 2) may also have connections to customer sites and that customers may have to be provided with connectivity between two or more geographically distant sites over carrier network 20.

It will now be described how carrier network 20 is arranged to establish connections through which to forward encapsulated Ethernet traffic. A connection may be defined as an entity configured in a network, which connection provides transport of data from a source node to one or more sink nodes.

As described above, carrier network 20 must be at least partially-meshed, i.e., there must be more than one possible path between at least some, and preferably all, of the nodes of the network. Thus, as will be explained below, the known Ethernet MAC address auto learning functionality should preferably be at least partially deactivated.

On start-up (or on re-start), conventional switched Ethernet networks behave like "classic" Ethernet Local Area Networks (LANs) in that every Ethernet frame is broadcast across the entire network. Thus, every switch, receiving an Ethernet frame on one port, broadcasts the Ethernet frame out on every other port. The process repeats as the frame is received by other switches. Thus, the frame is broadcast across the entire network.

MAC address auto-learning functionality is provided to improve configuration efficiency in switched Ethernet networks. Ethernet frames have source and destination MAC addresses corresponding to their source and destination Ethernet switches. (An Ethernet switch here is signifying an end system which is therefore configured with at least one MAC address.) When an Ethernet frame sent out by a source switch is received by a receiving intermediate or destination Ethernet switch, the receiving switch observes the port on which the frame was received and the source address of the frame. The receiving switch then builds up a forwarding table for use in future frame switching. The forwarding table maps destination address to output port and is built up using the source address of a received frame and the input port on which the frame was received. Over time, the network builds up forwarding state enabling efficient switching of Ethernet frames, without relying on broadcast any further.

It can thus be seen that conventional switched Ethernet networks using auto-learning must be simply-connected, i.e., there must be one and only one path between each and every node of the network. If there were multiple paths between any two nodes, the input port on which a frame is received from a source node would not be a reliable indicator of the correct output port on which to forward future traffic destined for that node. Inconsistencies in forwarding tables on Ethernet switches could result in looping of frames. Moreover, if there exists a loop in a part of the network, then any broadcast packet will be continuously duplicated in that loop and the duplicates forwarded all over the whole network, limited only by the link capacities concerned. This inevitably results in catastrophic failure of the network.

Figure 3:
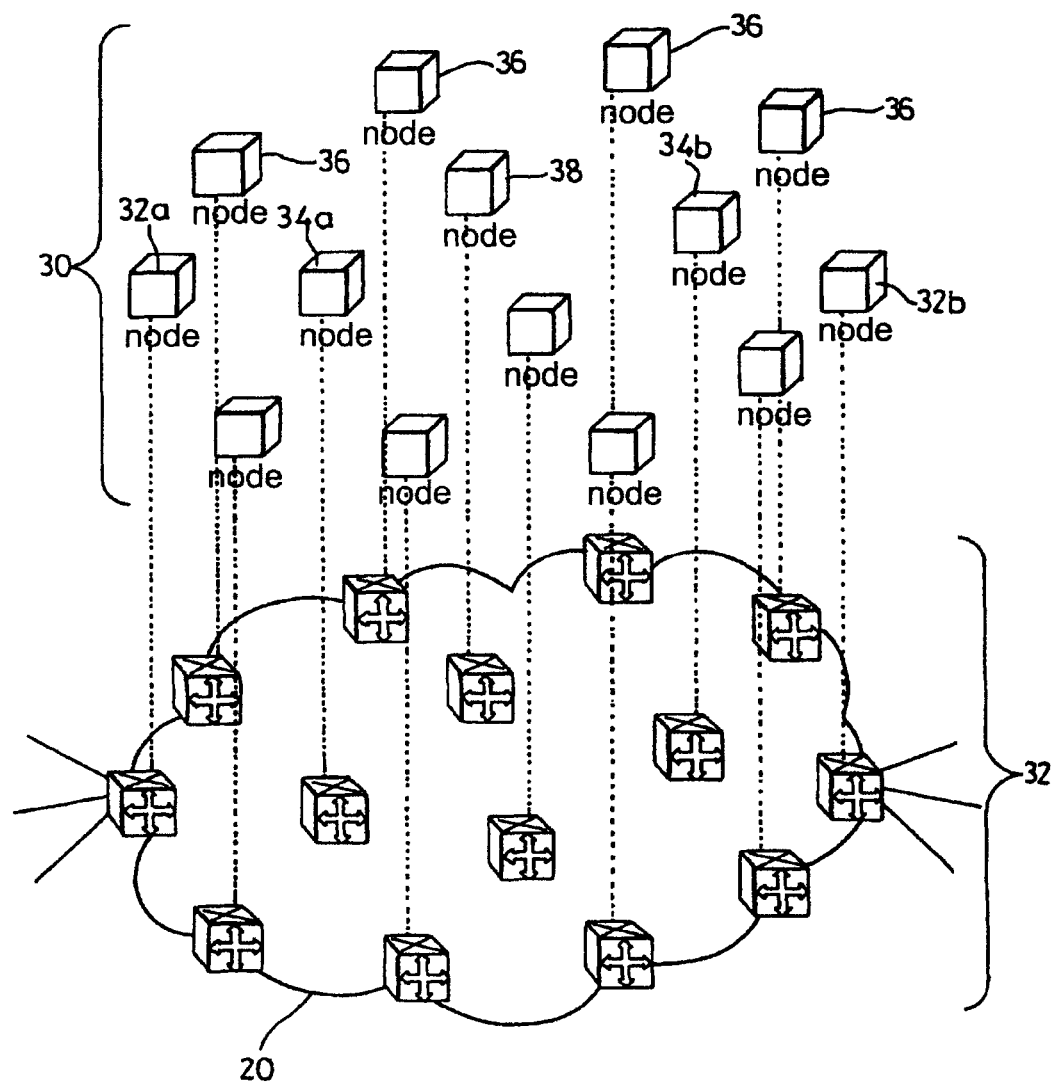
FIG. 3 shows a control plane/transport plane architecture for controlling the Ethernet carrier network of FIG. 1 according to aspects of the present invention.

According to aspects of the present invention, instead of using auto learning to configure forwarding tables in Ethernet switches, forwarding tables are directly configured using a novel Ethernet control plane. FIG. 3 shows a control plane/transport plane architecture for controlling the Ethernet carrier network of FIG. 1. The ITU-T Automatically Switched Transport Network (ASTN), sometimes known as the Automatically Switched Optical Network (ASON), may be used preferentially.

The general architectural specification of the ASTN is set out in ITU-T Recommendation G.8080.

Control plane 30 comprises a number of connection controllers 32a, 32b, 34a, 34b, 36 and 38 corresponding to each of Ethernet switches 22a, 22b, 24a, 24b, 26 and 28 of carrier network 20 (not all connection controllers are labeled in FIG. 3, for clarity). Control Plane 30 may be conceptually thought of as lying "above" transport plane 32 which comprises the Ethernet switches 22a, 22b, 24a, 24b, 26 and 28 of carrier network 20. Connection controllers (CCs) 30 are logical agents, each CC corresponding to a respective Ethernet switch (which represent cross connects in ASTN terminology) in transport plane 32. Each CC controls the switching of its respective switch using Connection Control Interface (CCI) signaling (shown as dotted lines in FIG. 3). CCI signaling is used to directly configure the forwarding tables used by Ethernet switches 22a, 22b, 24a, 24b, 26 and 28 of carrier network 20. CCs may communicate between themselves using a Network-to-Network Interface (NNI). Typically, CCs will exchange information regarding their operational state and the state, in particular the capacity, of their communications links using NNI signaling. Other control plane functions, such as heartbeat, ping and circuit monitoring, may be provided using the ITU-T standard-in-preparation currently referred to as Y.17ethOAM or the methods in IEEE standard 802.1ag.

While CCs 32a, 32b, 34a, 34b, 36 and 38 are logically separate from Ethernet switches 22a, 22b, 24a, 24b, 26 and 28, the reader will understand that they may be implemented in the same physical nodes in a distributed control plane model.

Additionally, one CC may control one or more Ethernet switches which is moving towards a more centralized control plane model. Furthermore, NNI signaling may take place over the same communications links used for transporting user traffic.

Figure 5:
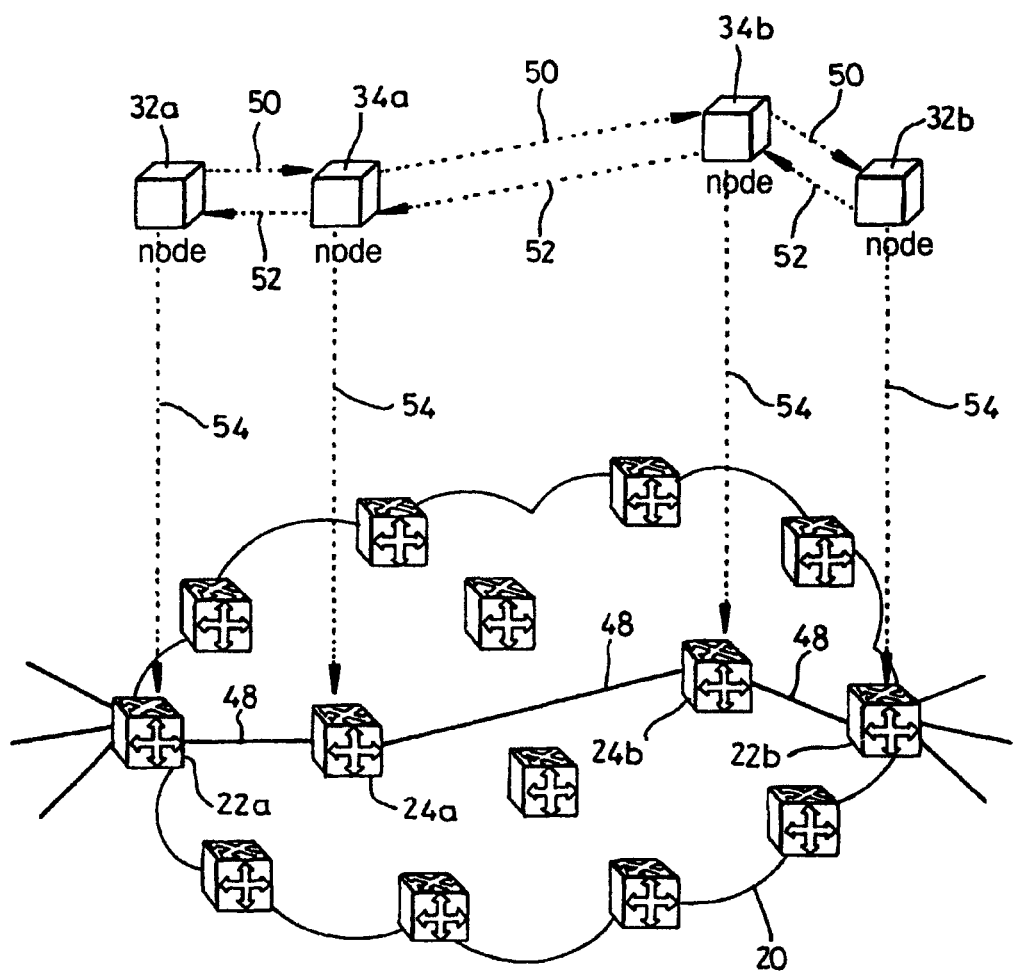
FIG. 5 shows how nodes of the control plane interact with Ethernet switches of the transport plane to establish a connection across carrier network according to aspects of the present invention.

FIG. 5 shows how control plane 30 interacts with transport plane 32 to establish a point-to-point connection across carrier network 20. Typically, the connection will be bidirectional, although this can simply be considered as the combination of two unidirectional point to point connections. A request to establish a connection specifying a required bandwidth and an explicit route across carrier network 20 is generated, for example, by a supervisory network management node (not shown) or distributed network management system or function. The explicit route will have been determined in accordance with a conventional routing protocol while taking into account the topology of the carrier network, the operational state of network resources and the bandwidth requirements of existing and possible future connections. The route to be taken by the exemplary connection shown in FIG. 5 spans Ethernet switches 22a, 24a, 24b and 22b over communications links 48. Since the connections share many qualities with SONET/SDH trails, management systems already developed for SONET/SDH trail management may be re-used for managing connections in the present invention, for example, the Optical Network Manager by Nortel of Brampton, Canada. This has the advantage that carrier networks already using SONET/SDH trail management systems need not invest in new management systems when deploying the network arrangements proposed in aspects of the present invention. The route may also be established by direct NNI signaling between CCs in an ad-hoc fashion.

The request to establish a connection is first sent to CC 32a. On receipt of the request, CC 32a checks whether the communications link between switches 22a and 24a has sufficient capacity to support the required bandwidth. If so, it forwards a connection setup request message 50 to CC 34a specifying the required bandwidth and explicit route. CC 34a then checks whether the communications link between switches 24a and 24b has sufficient capacity to support the required bandwidth. The process continues until the connection setup message request 50 reaches CC 32b. Along the route, CCs may optionally reserve bandwidth of their respective switches and communication links so as to avoid race conditions where competing connections are setup over the same resources.

When connection setup request message 50 reaches CC 32b, if there is sufficient bandwidth along the entire path to support the required connection, then CC 32b sends a connection setup response message 52 back to CC 34b, CC 34a and finally to CC 32a. As the connection setup response message 52 traverses the CCs, each CC sends CCI signaling 54 to its respective switch to configure the forwarding tables of each switch, thereby to establish the forwarding state required to setup the connection.

It will be appreciated that the mechanism for establishing connections across carrier network 20 described above is merely exemplary and other well-known mechanisms may be used. For example, all the admission control may be performed in a centralized CC controlling several if not all the Ethernet switches in the extreme. In another example arrangement, the supervisory management function may be used to compute routes for connections and simultaneously perform the necessary admission control; this in turn would simplify the role performed by the CC. Yet another example is where the supervisory management function or CC consults a specialized and either centralized or distributed Bandwidth Manager or Policy Decision Function to perform the admission control.

Typically, there will be many thousands or tens of thousands of connections established across a carrier network at any time. These connections will share the physical resources of the carrier network, i.e., the switches and communications links. Thus, each switch will typically have a large number of connections established through it at any point in time. However, each switch must be able to forward data traffic according to the explicit route requirements of the specific connection through which that traffic is being sent. A likely scenario is that the carrier network will need to establish multiple connections from the same source nodes, multiple connections to the same destination nodes and multiple connections both from the same source nodes and to the same destination nodes. However, for traffic engineering purposes, the latter connections may need to be established through physically distinct routes across the network. Furthermore, these routes may need to converge and diverge again within the carrier network. To support such route flexibility in connections, what is required is that each switch be able to differentiate between data traffic traveling in different connections and forward accordingly.

However, conventional switched Ethernet is incapable of this. As described above, conventional Ethernet switches forward traffic based solely on a forwarding table (established through auto learning) mapping destination address to output port. As a result, a conventional Ethernet switch will not be able to differentiate between data traffic having the same destination address, although it may be associated with multiple different connections.

According to aspects of the present invention, VLAN tags are used to enable differentiation of connections established across a carrier network and thereby to enable differential forwarding. Preferentially, the VLAN tag defined in IEEE 802.1q is applied in a novel manner such that the Ethernet switches of carrier network 20 are 802.1q VLAN-aware but arranged to use a combination of destination address and VLAN tag to forward data traffic. This is preferentially achieved by reusing the existing capabilities in each Ethernet switch to store separate forwarding tables for each VLAN tag configured, the VLAN tag acting as a mapping (or indexing) to forwarding tables, and each forwarding table mapping destination address to output port. However, in aspects of the present invention, the group of forwarding tables are arranged to provide a mapping from a combination of destination address and VLAN tag to output port.

According to aspects of the preferred embodiment, VLAN tags have meaning only within the context of a destination address. As such, the allocation of VLAN tags is logically localized to the node owning the destination address, herein called the destination node. Thus, at the point where a new connection is requested, the destination node of the new connection will allocate, to the new connection, a VLAN tag to use in combination with a destination address corresponding to the destination node. This VLAN tag will be allocated such that no existing connection to the destination address whose route crosses with, and subsequently diverges from, the new connection shall share a VLAN tag. This is such that, where differential forwarding is required (at the divergence point), the destination address/VLAN tag pair of the diverging connections are distinct.

Additional constraints can be placed on the allocation as described elsewhere to improve pathological behavior in case of inadvertent partial route removal in a network where broadcast-on-unknown is not fully disabled on all VLAN tags used for connections.

Alternately, for simplicity, but at a cost of reduced scalability in VLAN tag usage, the destination node shall allocate a unique VLAN tag for each connection going to a given destination address.

The VLAN tag having been allocated, the VLAN tag may be applied to packets where connections first do, or may, diverge in route and/or where the traffic first enters a trafficengineered domain. Where encapsulation is not being performed, this would usually be where the traffic is first segregated by connection, for example, by layer 3-7 filtering. Where the preferred method of encapsulation of customer data is being performed, the node containing the encapsulation point is the preferred logical location for the application of the VLAN tag.

At a similar point towards the egress of the connection, the VLAN tag should be removed. Assuming the destination node is identified as the correct point to remove the VLAN tag allocate above, it is permitted for the destination node to use the destination address/VLAN tag pair, possibly in combination with the ingress port at which the packet arrives, as context for the interpretation of the payload.

Those skilled in the art will realize that there are innumerable ways in which the packets to be transported through a given connection can be identified and that this decision is a purely local function that occurs at the source node (with reference to the de-encapsulation/un-tagging destination) and so can be different among the plurality of tag-applying nodes. However, a few examples may help to clarify:

an association between a specific physical customer-facing port, an encapsulation function, an encapsulation service ID and a given connection;

an association between a specific physical customer-facing port, a customer VLAN tag, an encapsulation function, an encapsulation service ID and a given connection;

a layer 3-layer 7 switch identifying a SIP-signaled VoIP flow and establishing a new connection for the flow, will establishing a suitable filter to identify all of the packets of the flow and attaching the appropriate VLAN tag to packets of the flow to route the packets along the established connection; and an in-box logical association between a certain connection, encapsulation function and encapsulation service ID with a port of a virtual customer-address-space Ethernet switch instance (as per later VPLS explanation).

Figure 6:
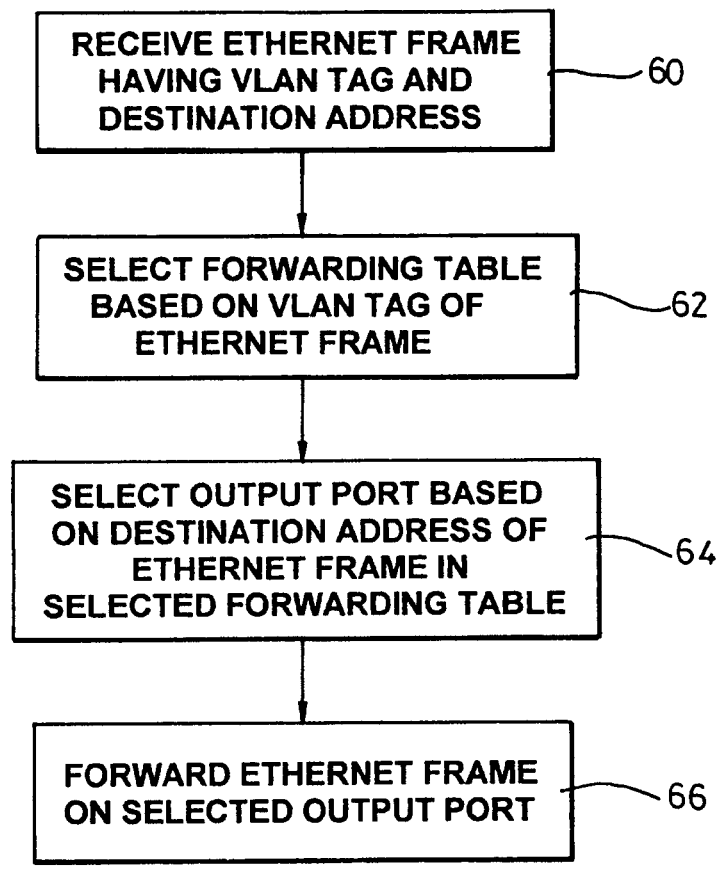
FIG. 6 is a flow diagram showing the preferred use of VLAN tag and destination address to differentiate forwarding of data traffic in different connections across the carrier network, according to aspects of the present invention.

FIG. 6 demonstrates the actions on receiving an Ethernet frame (step 60) at an Ethernet switch after the stage at which VLAN tag has been assigned as described above, where the switch first selects a forwarding table based on the VLAN tag contained in the frame (step 62). Then, the switch selects an output port based on the destination address contained in the frame (step 64). Finally, the switch forwards the frame on the selected output port (step 66).

This method of differential forwarding using the combination of VLAN tag and destination address should be contrasted with the method of the prior art. IEEE 802.1q is exemplar of the prior art in which a VLAN is defined to be a partitioning of network resources, for example, where the network resources may be defined in terms of ports. A VLAN is a specific set of ports, a subset of all the ports in the network. More specifically, the subset of ports would be connected such that data frames may flow only between any of those ports within the subset and not between ports in the subset and other ports in the network. As a direct consequence of this arrangement, any other subset of ports of the network that is disjoint from the first subset of ports, i.e., not connected, must have a distinct VLAN tag. Whereas, within the method of aspects of the present invention, all ports of the network, even where in disjoint subsets, may have the same VLAN tag. This is because the partitioning of network resources is achieved by the combination of VLAN tag and destination MAC address. The procedure by which the network is configured in aspects of the present invention to enable differential forwarding of connections has been described above.

The prior art VLAN-aware bridges, described above with reference to FIG. 1, implement a structural mechanism by which a VLAN tag is used, first, to determine the validity of the tag and, second, to access a forwarding table to determine from the MAC address how to forward the frame. This same structural implementation may be reused by aspects of the present invention to functionally behave such that the combination of VLAN tag and destination MAC address determine a differential forwarding behavior. The advantage of using the same structural implementation, although not absolutely necessary, allows existing hardware Ethernet switches to be reused. However, the means and rules by which the forwarding tables are populated is distinct from the prior art: according to aspects of the present invention, VLAN tags and entries in forwarding tables, corresponding to connections to be established across the carrier network, are directly configured into the appropriate Ethernet switches using the connection setup process described above. In the preferred embodiment, in which encapsulation is used, data traffic is associated with a particular connection on entry into the carrier network (more specifically at the ingress PE-Core) by giving the frames a selected VLAN tag as well as destination address (i.e., the MAC address of the egress PE-Core). Encapsulation in this context will ensure that the raw Ethernet frames received from the customer will not be altered in this process.

Figure 7:
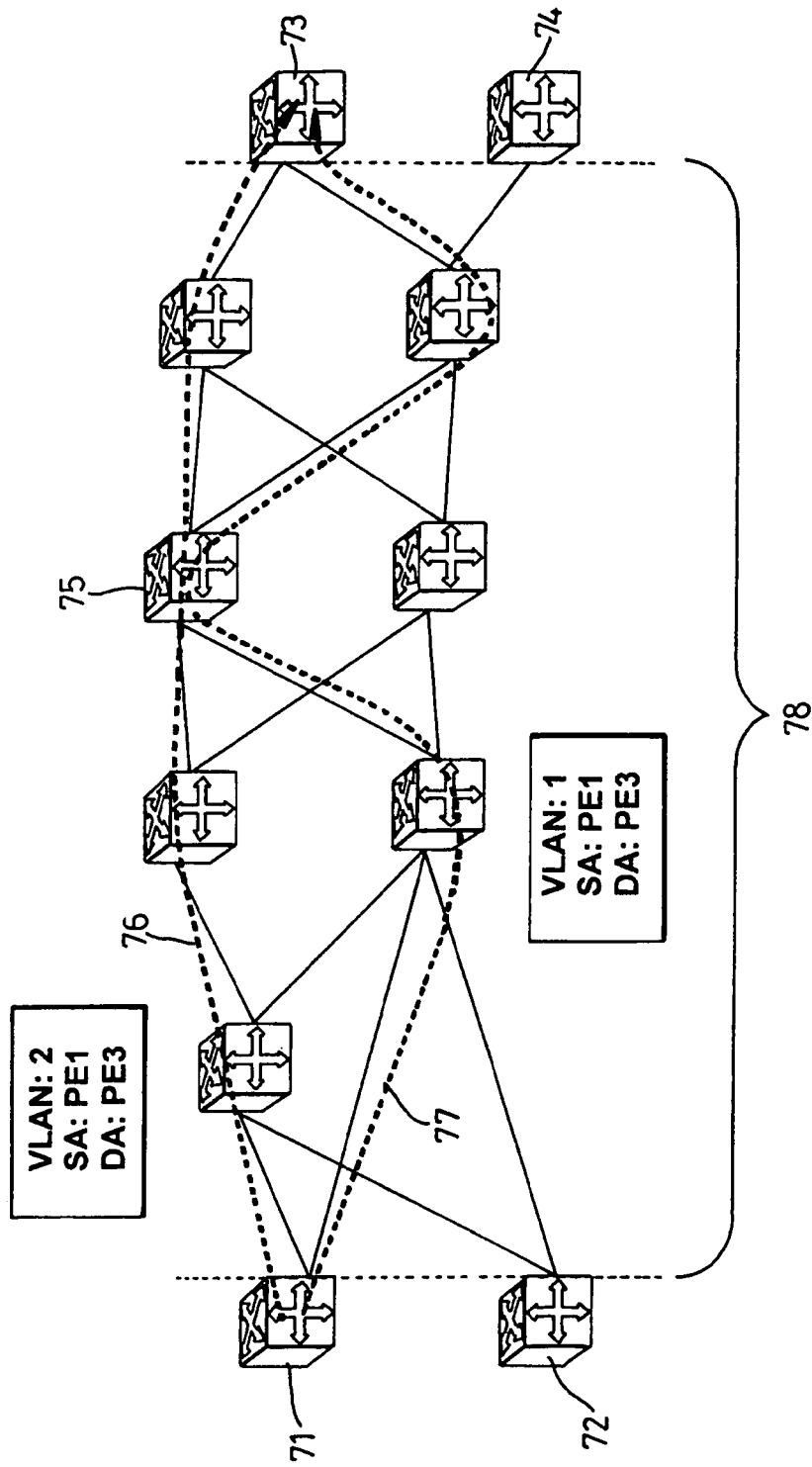
FIG. 7 shows an example of differential forwarding for two traffic flows having the same source and destination provider edge nodes but different VLAN tags according to aspects of the present invention.
Figure 8:
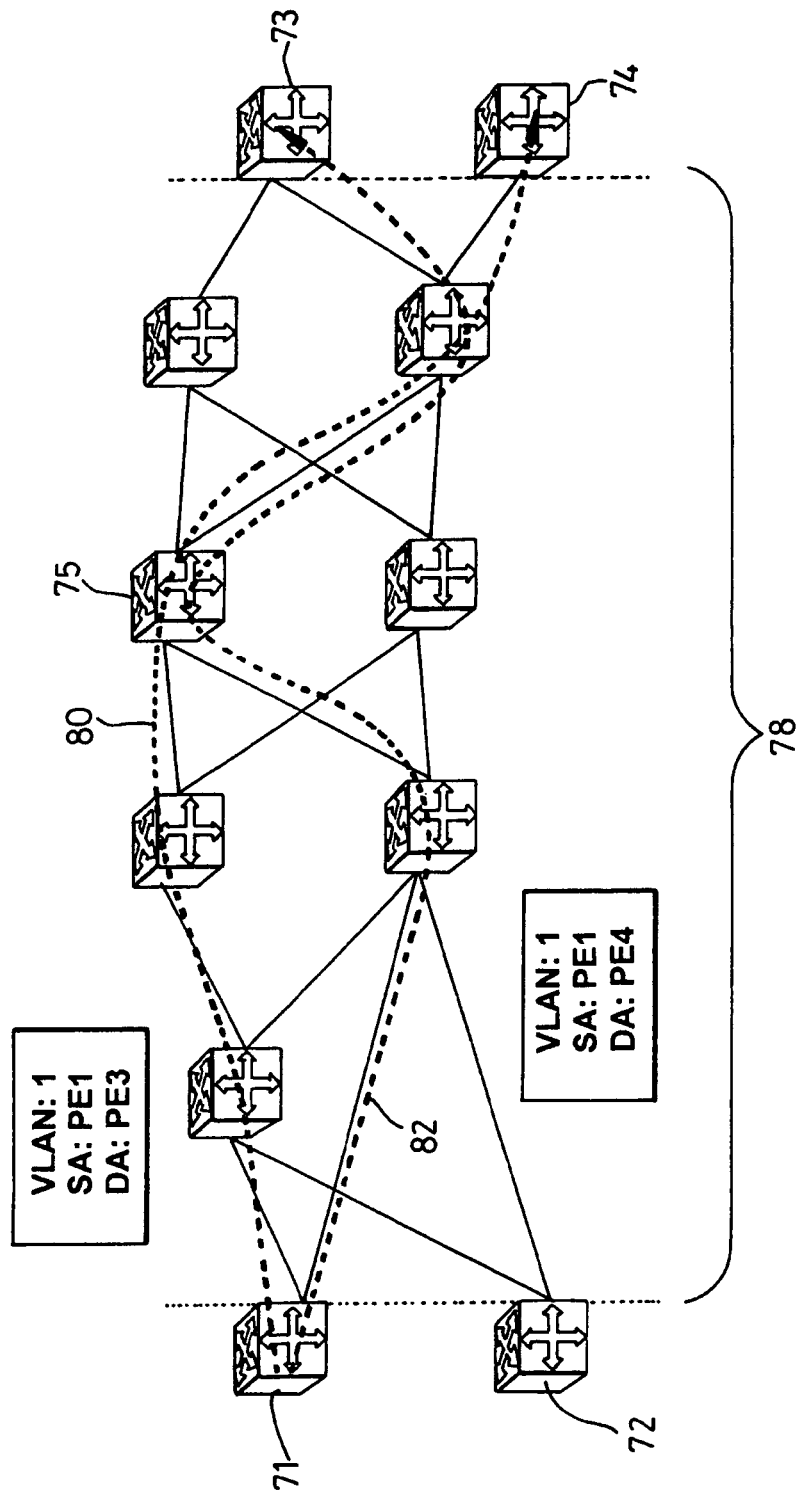
FIG. 8 shows an example of differential forwarding for two traffic flows having the same source provider edge nodes and VLAN tags but different destination provider edge nodes according to aspects of the present invention.
Figure 9:
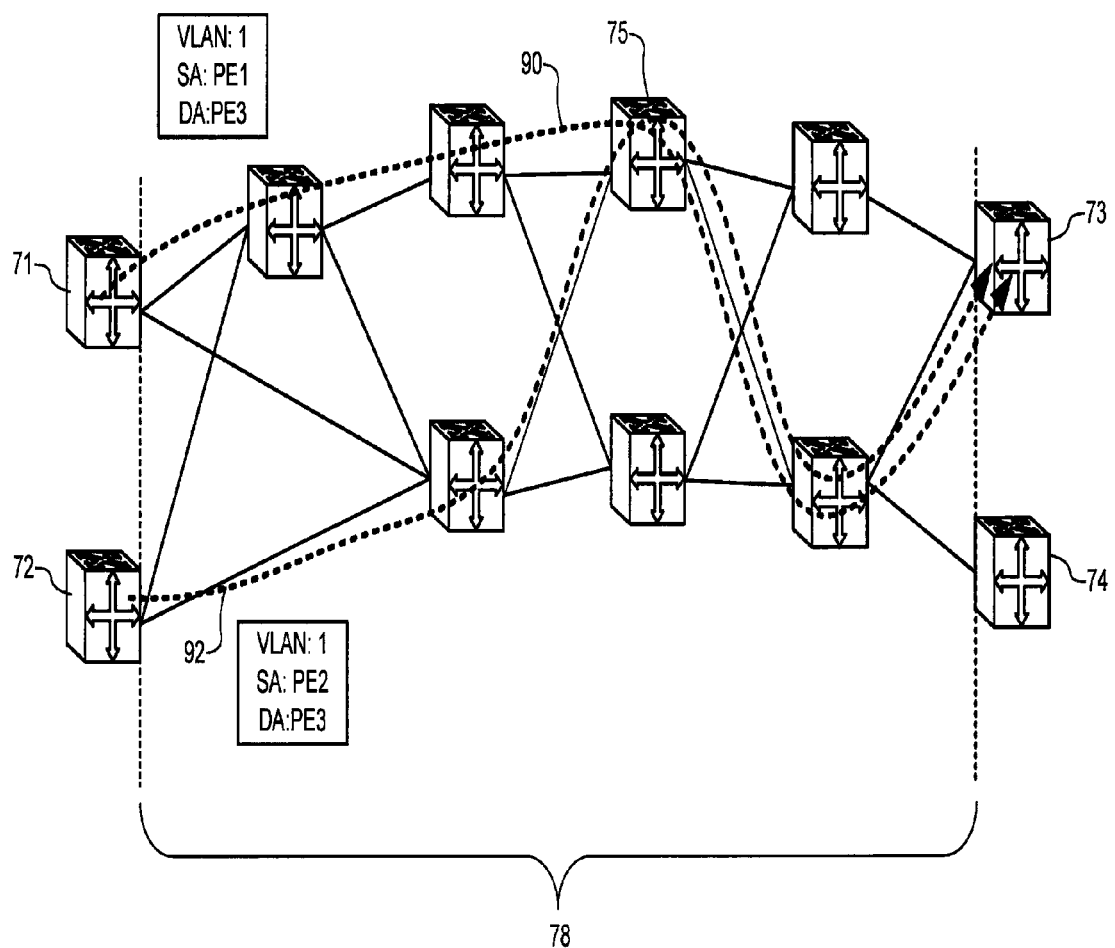
FIG. 9 shows an example of converged routing for two traffic flows having the same destination provider edge node and VLAN tags but different source provider edge node according to aspects of the present invention.

FIG. 7 and FIG. 8 show how the use of a combination of VLAN tag and destination address may be used to differentiate connections. FIG. 9 shows how a deliberate lack of differentiation in the combination of VLAN tag and destination address and selection of port causes convergence of otherwise individual connections. Each of FIG. 7, FIG. 8 and FIG. 9 show connections across a carrier network comprising four provider edge Ethernet switches 71, 72, 73 and 74 (corresponding to PE1, PE2, PE3, PE4), further Ethernet switches in core 78, including core Ethernet switch 75, and communications links between the core and edge switches (reference numerals omitted for clarity).

In FIG. 7, connections 76 and 77 have both the same source address (edge Ethernet switch 71-PE1) and the same destination address (edge Ethernet switch 73-PE3). However, the routes that connections 76 and 77 traverse are different. In particular, it can be seen that at core Ethernet switch 75, connections 76 and 77 converge and then immediately diverge. Despite the common destination address, core Ethernet switch 75 is able to differentiate frames belonging to connection 76 from frames belonging to connection 77 (and to forward them accordingly) on the basis of their different VLAN tags. Thus, data traffic in connection 76 has the VLAN tag 2, for example, whereas data traffic in connection 77 has the VLAN tag 1.

In FIG. 8, connections 80 and 82 have the same source address (edge Ethernet switch 71-PE1) and are given the same VLAN tag (in this case the VLAN tag is 1), but have different destination addresses. The destination addresses for connection 80 is edge Ethernet switch 73-PE3, while the destination addresses for connection 82 is edge Ethernet switch 74-PE4. Again, the routes that connections 80 and 82 traverse are different. In particular, it can be seen that, at core Ethernet switch 75, connections 80 and 82 converge and then follow the same path before diverging towards their destination points. Despite the common VLAN tags, core Ethernet switch 75 is able to differentiate frames belonging to connection 80 from frames belonging to connection 82 (and to forward them accordingly) on the basis of their different destination addresses.

From FIG. 7 and FIG. 8 it can be seen that differentiation between Ethernet frames belonging to different connections may be achieved according to the combination of destination address and VLAN tag. A difference in either may be used to achieve differential forwarding required for connections.

FIG. 9 shows how a deliberate lack of differentiation in the combination of VLAN tag and destination address and selection of port causes convergence of otherwise individual connections. In FIG. 9, connections 90 and 92 have the same destination address (edge Ethernet switch 73-PE3) and are given the same VLAN tag (in this case the VLAN tag is 1), but have different source addresses. The source address for connection 90 is edge Ethernet switch 71-PE1, while the source address for connection 92 is edge Ethernet switch 72-PE2. Again, the routes that connections 90 and 92 traverse are different, but this is only because the data traffic is injected into the carrier network from different ingress points, i.e., edge Ethernet switches 71 and 72. Once the routes converge at core Ethernet switch 75, the routes stay converged until their destination at edge Ethernet switch 73. This is because they have the same destination address and VLAN tag and there is no way of differentiating them on the basis of the combination of destination address and VLAN tag alone.

The ability to establish a plurality of connections between any two points in the network has advantages not only of resiliency, but also in service maintenance. The service maintenance aspect of the present invention refers to an ability to arrange "make before break" connections in order to change transport characteristics, route around planned maintenance, etc. The path re-route may be global with respect to the network, i.e., from source edge to destination edge, or may be local, in the sense that a part of the path between any two given nodes on the original path are re-routed.

The actual means by which traffic may be switched in this manner is advantageously only required to change a forwarding rule at a single node for any given direction of a connection. A data traffic flow may be re-routed by simply provisioning a new connection with a different VLAN tag and then using that VLAN tag in the MAC header of the Ethernet frames at the ingress point of the original connection. Re-routing of data flows in this way does not lose any frames since the new connection may be established contemporaneously with the old connection and new Ethernet frames directed into the new connection while earlier frames are still in transit over the old connection. Alternatively, the same VLAN tag and destination MAC address may be configured in nodes not on the existing path but arranged such that the first and last such nodes are connected directly to nodes on the existing path. Then by changing only the port on the node of the existing path that connects to the first such new node, all subsequently transmitted frames are forwarded over the new path. The frames of the new and old paths may be arranged to merge, as per FIG. 9, further downstream. Alternatively again, alternate connections may be pre-established, i.e., established in advance of any detected failure, over protection paths. Thus, re-routing data flows in the event of failure is even simpler and quicker, since the ingress point may immediately start transmitting frames over the pre-established alternate connection. Advantageously, and unlike conventional circuit-switched networks, pre-established alternate connections take up no bandwidth until actually being used. Thus 1:nor 1:1 protection schemes may be implemented without resulting in inefficient network resource utilization. If working paths have a differential path delay compared to the protection paths, then buffering may performed at one or more convergence points between the protection and working path to avoid out-of-order frame delivery due to re-routing between working and protection paths. Sequence identifiers may be used in addition or alternatively to enable frame re-ordering, for example. In this manner it is possible to effect a fully error free (hitless) switchover.

A further advantage of connections in an Ethernet network is the ability to grow the network organically, in that new nodes and links may be introduced to the network without causing any interference with existing nodes, links, connections or traffic. Any new connections may be established through the additional resources. Furthermore, existing traffic may be switched onto the new resources by any of the methods described heretofore. Consequently, there is enormous flexibility in the management of real and pragmatic networks.

So far, only the establishment of point-to-point (i.e., unicast) connections and multipoint-to-point connections, in the context of FIG. 9 where the traffic is either merged or multiplexed (the traffic only meets at the egress node), have been described. However, according to aspects of the present invention, point-to-multipoint or multipoint-to-multipoint connections may also be established across Ethernet networks, as will now be described. Conventional Ethernet switches are capable of a multicast service. Typically, a multicast service is achieved by configuring the forwarding table with more than one output port (but not necessarily all output ports) for a given multicast destination address. According to aspects of the present invention, for relatively small scale multicast operation, a point-to-multipoint connection may be configured as described above but using a combination of VLAN tag and multicast address mapping to more than one output port (but not necessarily all output ports) of selected Ethernet switches. However, this approach is only suitable for relatively small scale multicast operation.

According to aspects of the present invention, a carrier network supporting a large number of point-to-multipoint or multipoint-to-multipoint connections could be configured as a Resilient Packet Ring (RPR) emulated over the Ethernet MAC addressed network using multiple unicast connections established as described above. The following description is given in the context of a virtual private network (VPN) service, i.e., where there is a limited community of interest for each data frame. Two modes of operation are envisaged: a sparse mode for many customers with few sites; and a dense mode for few customers with many sites. The detailed mechanisms are described in Applicants' co-pending U.S. patent application Ser. No. 10/694,833 (publication number 2005-0094577 A1) entitled "Virtual Private Networks Within A Packet Network Having A Mesh Topology", which publication is incorporated herein by reference. The dense and sparse modes of operation will now be briefly described with reference to FIG. 10 and FIG. 11.

Figure 10:
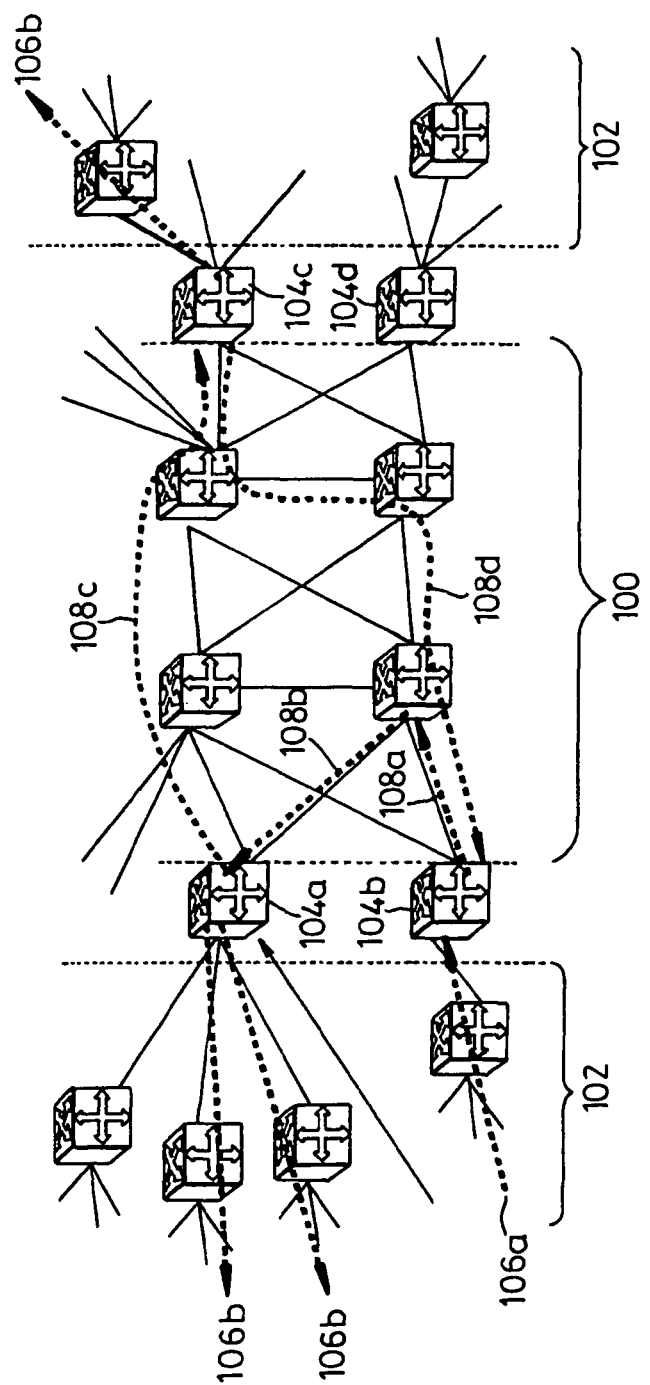
FIG. 10 shows a sparse mode of broadcast operation for customer VPNs provisioned across a carrier network, according to aspects of the present invention.

FIG. 10 shows a sparse mode of broadcast operation for many customers with few sites. FIG. 10 shows a part of carrier network 20 comprising a part of fully-meshed core network 100, PE-Core edge Ethernet switches 104a, 104b, 104c, 104d and PE-Edge edge Ethernet switches 102. Broadcast traffic 106a is received at PE-Core switch 104b from a customer site. Note that this traffic is broadcast within the context of a particular customer VPN, but is multicast within the context of the carrier network as a whole. The traffic is encapsulated and placed onto an RPR emulated by four unidirectional connections 108a, 108b, 108c, 108d (individually or collectively 108). The four connections are established as point-to-point connections as described above. The traffic is forwarded across each connection 108, in turn, until the traffic reaches the start point again at PE-Core switch 104b. On receipt of an encapsulated frame, each endpoint of the four connections determines whether to process the frame for distribution to the customer via PE-Edge edge Ethernet switches 102 to which it is connected. This determining is done on the basis of broadcast destination addresses contained in the frames and the VPN membership of customer sites attached to these Ethernet switches. Processing the frames involves de-encapsulating the frames and replicating the frames as required to one or more of PE-Edge edge Ethernet switches 102. It can be seen that no bandwidth need be dedicated to broadcast traffic in the sparse mode of operation since the four point-to-point connections may be trunked, i.e., the four point-to-point connections may be used to carry non-broadcast data and other customer's data, whether broadcast or not.

Figure 11:
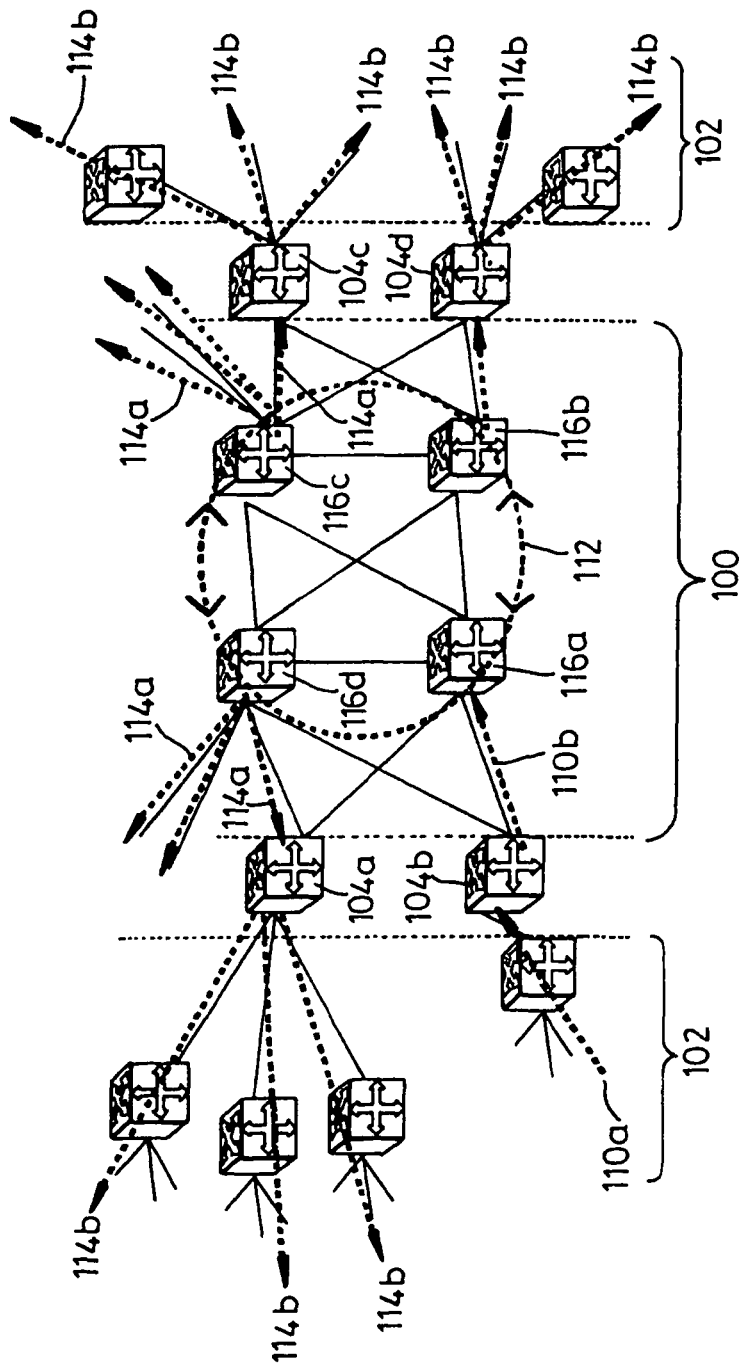
FIG. 11 shows a dense mode of broadcast operation for customer VPNs provisioned across a carrier network, according to aspects of the present invention.

FIG. 11 shows a dense mode of broadcast operation for few customers with many sites. FIG. 11 shows a part of carrier network 20 comprising part of a fully-meshed core network 100, PE-Core edge Ethernet switches 104*a*, 104*b*, 104*c*, 104*d* (individually or collectively 104) and PE-Edge edge Ethernet switches 102, as with FIG. 10. Broadcast traffic 110*a* is received at PE-Core switch 104*b* from a customer site. Note, as above, that this traffic is broadcast within the context of a particular customer VPN, but is multicast within the context of the carrier network as a whole. The traffic is encapsulated and forwarded over a unidirectional connection 110*b* to a core switch 116*a*. Unidirectional connection 110*b* may be trunked. At core switch 116*a*, the traffic is forwarded in over a bidirectional RPR 112 that is emulated by connections between core switches 116*a*, 116*b*, 116*c*, 116*d* (individually or collectively 116) using a bidirectional connection between each pair of adjacent nodes. The RPR 112 is dedicated to a particular customer's broadcast traffic and is not trunked. This is achieved by using a unique VLAN tag for forwarding in the RPR.

The traffic is forwarded around RPR 112 to each of the core switches 116 in one direction or the other, whichever is shortest for each respective core switch. Each core switch broadcasts the received frames over unidirectional connections 114*a* so that each of PE-Core switches 104 receives the traffic. Then, as with the sparse mode of broadcast operation described above, each PE-Core switch determines whether to process the frame for distribution to the customer via PE-Edge edge Ethernet switches 102 to which it is connected. This is done on the basis of broadcast destination addresses contained in the frames and involves de-encapsulating and replicating the frames, as required, and transmitting the frames to one or more of PE-Edge switches 102 for onward transmission to the customer sites.

Figure 12:
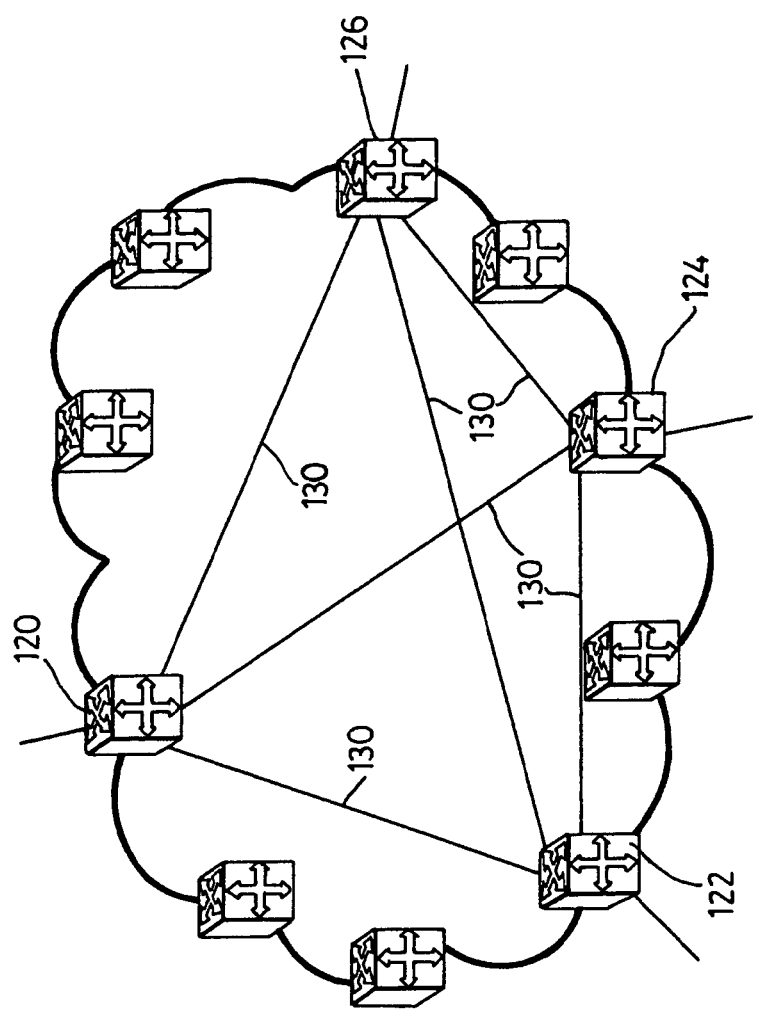
FIG. 12 shows arrangements for providing a Virtual Private LAN Service (VPLS) according to aspects of the present invention.
Figure 13:
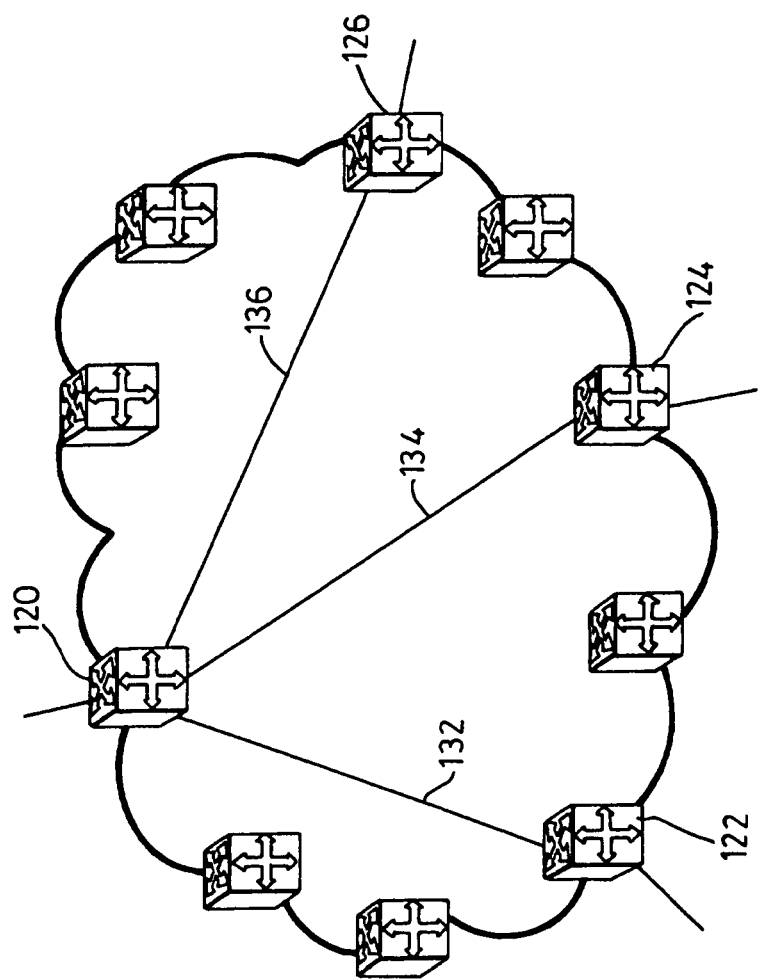
FIG. 13 shows arrangements for providing a Virtual Private LAN Service (VPLS) according to aspects of the present invention.
Figure 14:
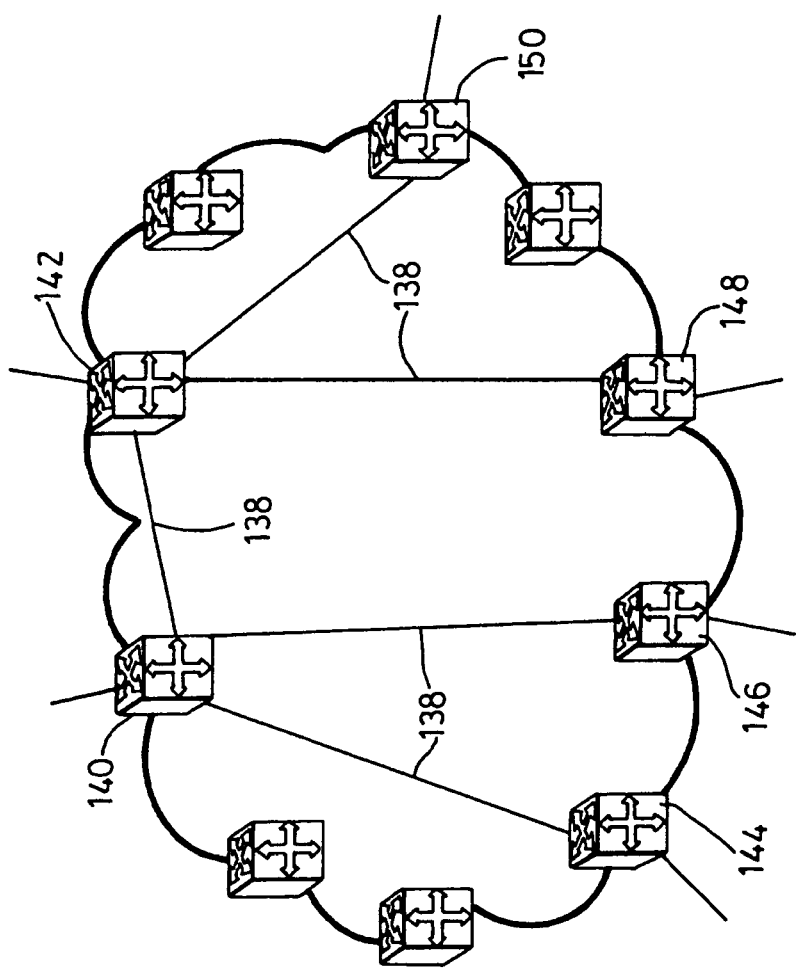
FIG. 14 shows arrangements for providing a Virtual Private LAN Service (VPLS) according to aspects of the present invention.

FIG. 12, FIG. 13 and FIG. 14 show exemplary arrangements of how Virtual Private LAN Services (VPLSs) may be provided according to the present invention. In VPLSs, potentially geographically distant hosts are provided with any to any communications capability over a carrier network which appears, to the hosts, to function as if the hosts were directly connected to a private Local Area Network (LAN). According to the present invention, VPLSs are provided over a meshed Ethernet carrier network over which connections may be established as described above. In each of FIG. 12, FIG. 13 and FIG. 14, carrier network cloud 20 is comprised of Ethernet switches, however, only Ethernet switches located at the network edge are shown for clarity.

In FIG. 12, one exemplary arrangement is shown in which four geographically distant customer sites (not shown) are respectively connected to four carrier edge nodes 120, 122, 124, 126, which are, themselves, connected in a full mesh via connections 130, established over the carrier network in accordance with aspects of the present invention, to provide a VPLS. In this arrangement, each of the carrier edge nodes 120, 122, 124, 126 provides conventional Ethernet functionality associated with the physical port used for customer attachment to the PE-core.

However, the Broadcast-on-Unknown function, MAC learning of customer addresses reachable via remote PE-cores, etc., is not associated with a physical Ethernet port on the core network side, but with a mesh of point-to-point connections between participating PE-cores, set up in accordance with aspects of the present invention. Thus, broadcast is performed by packet replication at the ingress PE-core, then encapsulation and unicast in the carrier domain. Each customer MAC address, as it is learned, is associated with the carrier network address and VLAN tag which is used to reach the remote PE-core.

In FIG. 13, another exemplary arrangement is shown in which four geographically distant customer sites (not shown) are respectively connected to four carrier edge nodes 120, 122, 124, 126 which are, themselves, connected in a hub and spoke arrangement via connections 132, 134, 136, established over the carrier network in accordance with aspects of the present invention, to provide a VPLS. A switch/router connected to carrier edge node 120 acts as the hub, whereas hosts or switches/routers respectively connected to carrier edge nodes 122, 124, 126 act as spokes. This switch/router could be owned by the customer, or could be owned by the carrier, located in a central office, and could be used to offer service to more than one customer. This switch/router is the single entity in the carrier network which needs awareness of customer MAC addresses. As above, each customer MAC address, as it is learned, is associated with the carrier network address and VLAN tag that is used to reach the remote PE-core. If a single physical switch is used to support multiple customers, conventional VLAN technology can be used to ensure customer separation in the switch/router. The hub switch/router is responsible, not only for providing communications between hosts connected to it and hosts connected to other customer sites, but also for forwarding communications between hosts connected to any two other customer sites. In the latter case, traffic traverses two connections over the carrier network, for example, connection 132 from carrier edge node 122 to carrier edge node 120 and connection 134 from carrier edge node 120 to carrier edge node 124. At carrier edge node 120, after traversing connection 132, the traffic emerges from the carrier network. The hub switch/router identifies that the traffic is for another customer site and switches/routes it back onto the carrier network via the connection 134.

In FIG. 14, another exemplary arrangement is shown in which six geographically distant customer sites (not shown) are respectively connected to six carrier edge nodes 140, 142, 144, 146, 148, 150 which are, themselves, connected in a dual hub and spoke arrangement via connections 138, established over the carrier network in accordance with aspects of the present invention, to provide a VPLS. Switches/routers connected to carrier edge nodes 140, 142 both act as hubs, whereas hosts or switches/routers respectively connected to carrier edge nodes 144, 146, 148, 150 act as spokes. As with the arrangement in FIG. 13, the hub switches/routers are responsible not only for providing communications between hosts connected to them and hosts connected to other customer sites, but also for forwarding communications between hosts connected to any two other customer sites. In the latter case, as with the arrangement in FIG. 13, traffic may traverse two connections or three connections if the customer sites are not directly connected by single connections to a single hub switch/router.

It will be appreciated that other arrangements of VPLSs are possible having any number of customer sites connected in a full mesh or in a single or multi hub and spoke arrangement or combinations of the two. The choice of arrangement will largely depend on the communities of interest in the various customer sites and the bandwidth required there between. In further embodiments, the two or multiple hub switches/routers may be provided at each customer site, each connected via connections to one or more other customer sites to provide load balancing and resiliency. The connections used to provide VPLS may be unique to the customer or trunked in the sense that multiple customers use trunk connections.

Data plane monitoring functions such as heartbeat, ping and connection monitoring using the ITU-T standard-in-preparation currently referred to as Y.17ethOAM has been mentioned above. These methods may be used to perform end to end connection monitoring and fault detection as follows. In one embodiment, a defined and well-known Ethertype is assigned to Operations and Maintenance (OAM) frames, such as heartbeat or ping messages, which are sent across the end to end connections established in the network using the same destination address and VLAN tag as data plane traffic is sent across those connections. The Ethertype field is not used for forwarding in the network but is used to filter OAM traffic from data frames at the network edge. OAM frames may then be forwarded to OAM systems. Thus, OAM frames, such as heartbeat or ping messages, will be forwarded in the network in the same way as of data plane frames and will therefore share the same fate as data plane frames. Thus, OAM traffic can be used for fault detection and end to end connection monitoring. In a second embodiment, OAM traffic is not forwarded over the same connections as data plane traffic. Rather, separate OAM connections are established using 9ne or more different destination addresses to those connections to be used for data plane traffic. Individual OAM connections are at least partially co-routed and possibly fully co-routed with individual data plane connections so that OAM frames share the same fate as data frames at least over the co-routed portions. However, the different destination addresses correspond to the address or addresses of a OAM management system or server. Advantageously, this avoids the need for line-rate filtering on Ethertype at network edge nodes. It is also advantageous in a further embodiment to preferentially arrange a largely separate mesh of OAM connections across the network which can be monitored and used to "triangulate" the location of faults through correlation. This could be used to determine the affected data plane connections, while there may be little fate sharing between any one individual OAM connection and any one individual data plane connections.

The frequency of the ping or heartbeat frames may be used to adjust the distribution of the time interval to detect faults. The detection of faults may be used to trigger a protection switch onto a suitably configured protection path and the trigger may be effected directly in hardware or software. Alternatively, the alarms may be filtered in a higher order system before triggering a protection switch to improve control of the network. End to end OAM in a connection may limit the frequency with which pings and heartbeat may be sent so as not to overload the network with this traffic type. In a further embodiment it is possible to implement pings and heartbeats on each individual link between Ethernet switches, or on segments of the end to end connections. Any detected failure on such a link or segment is straightforwardly correlated to the connections it affects by direct consultation of the forwarding tables in the Ethernet switches at either end. The alarm state may be propagated along all or some of the respective connections to the end point to trigger the same protection mechanism above. However, the link or segment heartbeats may be sent at higher frequency than those of an end to end connection with a much lower chance by orders of magnitude of overloading the network, since links and segments are much fewer in number.

To enforce QoS requirements, such as bandwidth guarantees, over connections established according to aspects of the present invention, admission control and policy enforcement may be implemented at ingress nodes as described above. Admission control may also be performed in the control or management planes, also as described above. Different classes of service may be provided for traffic forwarding by classifying customer traffic on the basis of customer and/or one or more of the following: VLAN tag, IEEE 802.1p priority level, DiffServ Code Point (DSCP), MPLS EXP bits and so on. The classification may be mapped to carrier VLAN tag or using IEEE 802.1p or 802.1ad strict priority level, for example, for marking and segregation in the carrier network. Those skilled in the art will appreciate that classes of service may be distinguished in very many ways that are compatible with aspects of the present invention.

Distinguishing classes of service may be based on a mapping of a explicit marking of an incoming frame by a wide variety of possible fields to an explicit marking in network 20, an explicit marking of an incoming frame by a wide variety of possible fields to an implicit forwarding treatment for a given connection in network 20, an implicit classification of a variety of possible fields in an incoming frame to an explicit marking in network 20, and an implicit classification of a variety of possible fields in an incoming frame to an implicit forwarding treatment for a given connection in network 20. Those skilled in the art will also appreciate that an original marking may be remapped or remarked on egress by those frames from network 20. Conflicts for forwarding resources at nodes of the carrier network may be resolved by:

1) using a strict priority scheduling scheme (such as IEEE 802.1p) in which frames of higher priority are always forwarded in preference to frames of lower priority;

2) using a weighted fair queuing scheduling scheme in which classes of frames having lower priority still have some proportion of forwarding resources albeit lower than classes of frames having higher priority; or 3) using a differential discard eligibility scheduling mechanism in which the discard rate (a function of queue fill) applied to frames entering the queue for output over an output port of an Ethernet switch is different for different classes of traffic.

In 3) above, the discard rate for classes of traffic having a lower priority is higher than the discard rate for classes of traffic having a higher priority for equivalent queue fill. Thus, proportionately more lower priority frames are discarded than higher priority frames as the output queue fills up. However, unlike in 1) and 2) above, frame disordering between different classes of traffic cannot occur because there is effectively only one queue. This has the advantage of permitting customers with guaranteed bandwidth connections to burst over agreed bandwidth limits using lower priority classes of traffic, without introducing potential disordering of frames. Those skilled in the art will appreciate that any or all of the mechanisms of classifying, marking, remarking, policing and scheduling may be applied to traffic according to the ability to differentiate connection forwarding using the combination of VLAN tag and destination MAC address, and any other fields of the frame as necessary.

Figure 15:
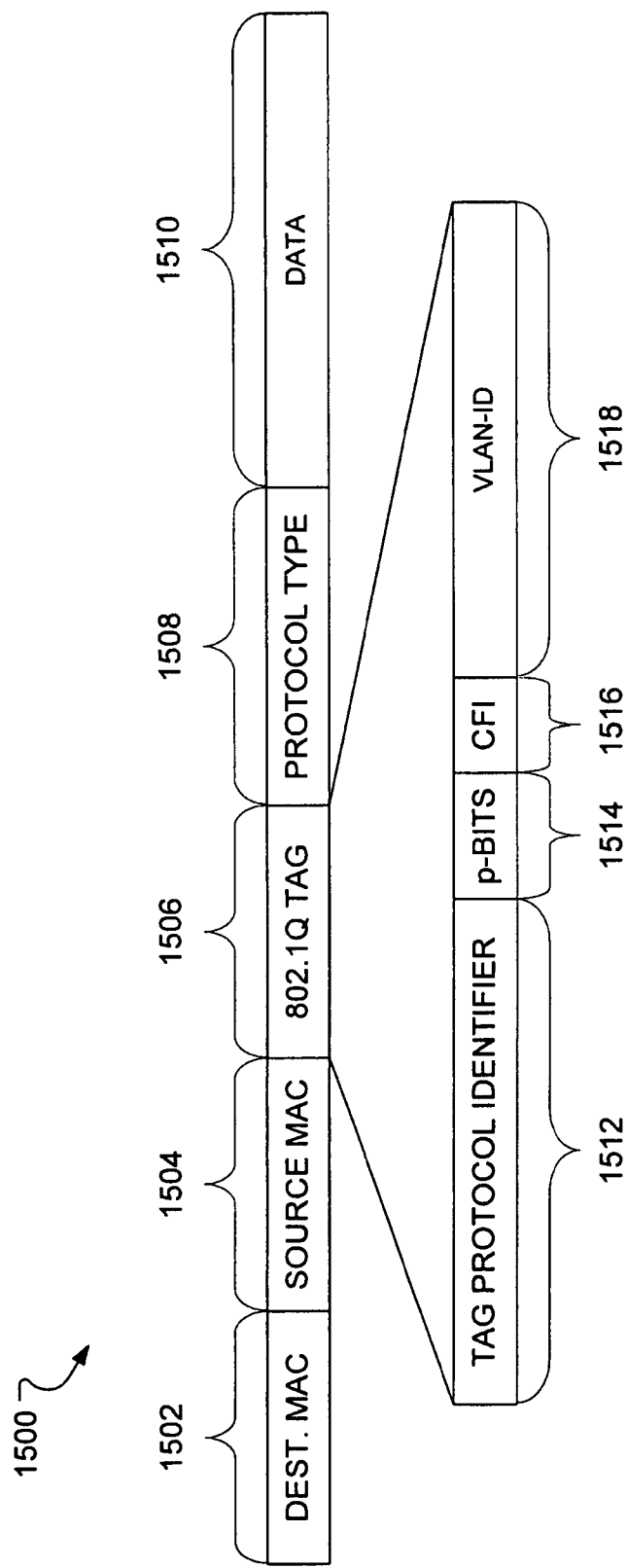
FIG. 15 illustrates a typical Ethernet frame according to the IEEE 802.1Q specification.

FIG. 15 illustrates a typical Ethernet frame 1500. The Ethernet frame 1500 includes a field for a destination MAC address 1502, a field for a source MAC address 1504, a field for an 802.1Q tag 1506, a field for an indication of the protocol type 1508 and a field for data 1510. The field for the 802.1Q tag 1506 is expanded to illustrates contents including a field for a tag protocol identifier 1512, a field for the p-bits 1514, a field for an Ethernet Canonical Format Indicator (CFI) 1516 and a field for a VLAN-ID 1518. Notably, the fields in FIG. 15 are not illustrated proportional to their respective sizes.

Hereinafter, terminology is borrowed from the specification of IP Differentiated Services (RFC 2475, referenced earlier). Such terminology includes "per-hop behavior", "per-hop scheduling class" and "drop precedence". As will be appreciated by the skilled reader, such terminology is not in wide use with respect to Ethernet frames but may be defined similarly for Ethernet networks. Borrowed terminology is used herein in place of more generic language, e.g., forwarding treatment, scheduling treatment, precedence, for the sake of clarity. To clarify the usage herein, an "E" will be used to distinguish an Ethernet per-hop behavior (E-PHB) from an IP DiffServ per-hop behavior (PHB), an Ethernet per-hop scheduling class (E-PSC) from an IP DiffServ per-hop scheduling class (PSC), etc.

"Scheduling class" is an IP DiffServ term that abbreviates per-hop scheduling class. Frames of the same scheduling class should be forwarded in the same scheduling queue and delivered in the order in which the frames were received.

In overview, two types of VLANs are described in the following: p-bits-Inferred-scheduling class VLAN (p-VLAN); and VLAN-10-Only-Inferred-scheduling class VLANs (v-VLAN).

A p-VLAN supports multiple scheduling classes. The scheduling class for a received Ethernet frame in a p-VLAN may be determined based on a "service map" that describes the relationship between the p-bits and scheduling classes and drop precedence. The service map may be specific to the VLAN-10 of the received Ethernet frame. For operations simplicity, a single service map may be shared by several VLANs, by all interface VLANs, or by each Ethernet switch in a given network.

A v-VLAN supports a single scheduling class. As such, the scheduling class for a received Ethernet frame in a v-VLAN may be determined based on the VLAN-10 of the received Ethernet frame. An Ethernet per-hop-behavior (E-PHB) for the received Ethernet frame may be determined based on a fixed mapping of particular p-bit values to particular E-PHBs.

In operation then, an Ethernet node receives an Ethernet frame and inspects the header of the Ethernet frame to determine a VLAN-10. In the p-VLAN case, the VLAN-10 may then be used as a reference to a service map that describes the relationship between the p-bits and a combination of scheduling class and drop precedence. In the v-VLAN case, there is no service map. The whole v-VLAN is associated with a scheduling class. The scheduling class and individual frame p-bits determine the frame PHB. That is, all frames in the v-VLAN have the same scheduling class but may have different drop precedence.

For a p-VLAN, a service map defines a relationship between p-bits and E-PHBs. A given E-PHB may be described as being made up of two components: a scheduling class and a drop precedence (OP). The p-VLAN definition provides, to a manager of an Ethernet-based network, an ability to combine multiple scheduling classes in a single VLAN. This ability to combine offers the advantages of operations simplicity and scalability, compared to multiple single scheduling class VLANs (as are known). Also, the p-VLAN definition offers the potential advantage of dynamic bandwidth sharing among the multiple scheduling classes defined for a single p-VLAN.

A service map may be configurable per p-VLAN. Optionally, configuration and operations simplicity can be achieved by defining several default service maps per network, per provider edge or per interface. The VLAN-ID of a received Ethernet frame may then allow an Ethernet node to determine a service map for the received Ethernet frame.

Optionally, the service map may be signaled per p-VLAN, especially if the p-VLANs use connection-oriented networking as proposed elsewhere in this application. That is, rather than pre-configuring service maps for each p-VLAN, service maps may be signaled by the edge node during the p-VLAN connection or path establishment/modification process. As an example, this process may be carried out in a similar fashion to MPLS LSPs in RFC 3270.

FIG. 16A illustrates a first exemplary service map 1600. The first exemplary service map 1600 provides a mapping between p-bits and E-PHBs. For a given Ethernet frame including a set of p-bits with a given value, an E-PHB may be determined from the first exemplary service map 1600.

FIG. 16B illustrates an E-PHB to scheduling class and forwarding treatment mapping 1602 of E-PHBs to information regarding treatment of Ethernet frames that may be determined based on an E-PHB. From a given E-PHB, a scheduling class (E-PSC), a scheduling queue, a drop precedence may be determined and used when forwarding the given Ethernet frame.

In the first exemplary service map 1600, eight E-PHBs are identified as E-EF, E-AF41, E-AF42, E-AF43, E-AF21, E-AF22, CS-2 and E-DF. Such identifications, apart from the "E-" prefix, should be familiar to the skilled reader as being related to "Expedited Forwarding" (EF), "Assured Forwarding" (AF), "Class Selector" (CS) and "Default Forwarding" (DF) as used in IP DiffServ. The Expedited Forwarding PHS is described in Davie, B., et al., "An Expedited Forwarding PHB (Per-Hop Behavior)", IETF RFC 3246, March 2002, the Assured Forwarding PHB is described in Heinanen, J., et al., "Assured Forwarding PHB Group", IETF RFC 2597, June 1999 and the Class Selector PHB is described in Nichols, K., et al., "Definition of the Differentiated Services Field (DS Field) in the 1Pv4 and 1Pv6 Headers", IETF RFC 2474, December 1998 (see http://www.ietf.org/ www dot ietf dot org).

The Expedited Forwarding (EF) E-PHB may be considered suitable for Ethernet frames related to services that require frames to be delivered within tight delay and loss bounds. Reordering of the Ethernet frames is not allowed.

The Assured Forwarding (AF) E-PHB generally defines N classes, with each of the N classes having M discard priorities (drop precedence). E-AFik means E-AF class i and drop precedence k, where 1<=i<=N and 1<=k<=M. Reordering of the Ethernet frames is not allowed within a class.

The Class Selector (CS) E-PHB generally defines eight classes, with higher order classes (i.e., CS-2) having a higher probability of timely forwarding than relatively lower order classes (i.e., CS-1).

The Default Forwarding (DF) E-PHB may be considered suitable for Ethernet frames related to services with no performance guarantees, e.g., best effort. Reordering of the Ethernet frames is not allowed.

The first exemplary service map 1600 of FIG. 16A includes one scheduling class (E-AF4) that has three possible drop precedence indications, one scheduling class (E-AF2) that has two possible drop precedence indications and three scheduling classes (E-EF, CS-2 and E-DF) that have one possible drop precedence indication each.

In the first exemplary service map 1600 of FIG. 16A, there is a direct correlation between service and scheduling queue, that is all Ethernet frames that are associated with a particular scheduling class are placed in the same scheduling queue. Notably, in alternative configurations, multiple scheduling classes may be associated with a single scheduling queue, depending on nodal capability and configuration policy.

From the first exemplary service map 1600 of FIG. 16A, it may be considered that a given Ethernet frame having p-bits with the value "101" will receive treatment from an Ethernet device according to the AF42 E-PHB. That is, the given Ethernet frame will be considered to have an E-PHB of AF42. Turning to the mapping 1602 of FIG. 16B, it may be determined that the scheduling class of the given Ethernet frame is E-AF4, the given Ethernet frame will be placed in scheduling queue 2 and have a medium (yellow) drop precedence.

A second exemplary service map 1700A presented in FIG. 17A includes four scheduling classes (E-AF4, E-AF3, E-AF2, E-AF1) that have two possible drop precedence indications each.

A third exemplary service map 1700B presented in FIG. 17B includes two scheduling classes (E-AF4, E-AF3) that have two possible drop precedence indications each and four scheduling classes (E-EF, E-AF2x, CS-2, E-OF) that have one possible drop precedence indication each.

A fourth exemplary service map 1700C presented in FIG. 17C includes two scheduling classes (E-AF4, E-AF2) that have three possible drop precedence indications each and two scheduling classes (E-EF, E-OF) that have one possible drop precedence indication each.

A fifth exemplary service map 1700D presented in FIG. 17D includes eight scheduling classes (CS-7, CS-6, CS-5, CS-4, CS-3, CS-2, CS-1, CS-0) that have one possible drop precedence indication each.

It is known to use a "bandwidth profile" to specify traffic measurement parameters, including committed information rate (CIR), excess information rate (EIR), committed burst size (CBS), excess burst size (EBS), for traffic over a given connection. A bandwidth profile may, optionally, be specified for a p-VLAN, for use at a network node by various traffic management functions such as QoS-based routing, admission control, resource allocation (e.g., buffer and scheduling resource), traffic policing and traffic shaping.

In a first option, a single bandwidth profile is specified for an entire p-VLAN. Although this first option is simple, the first option is imprecise for network resource allocation and engineering purposes.

In a second option, a bandwidth profile may be specified per scheduling class. Although this second option is more precise than the first option, the precision comes at a cost of reduced scalability based on the inherent increase in complexity.

In a third option, a single bandwidth profile may be applied across several scheduling classes (e.g., for the scheduling class related to voice communication and the scheduling class related to real-time video communication). This third option may be seen as a compromise between the first option and the second option.

Notably, according to RFC 3270 (referenced earlier), an MPLS E-LSP can only be specified with a single bandwidth profile for the entire LSP.

It may be considered that, by defining p-VLANs according to service maps, as provided by the preceding, many advantages may be realized. For instance, the service maps provide an ability to support up to eight E-PHBs within a single VLAN. The service maps may also be seen to lead to increased network scalability, simplified configuration and operations, and bandwidth sharing among the scheduling classes within the single VLAN. The use of service maps may also be seen to simplify interoperability between multiple network nodes/segments from single or multiple vendors and reduce configuration errors.

The service maps allow for flexible mappings so that various application needs, e.g., requiring a trade-off between a number of drop precedence indications and a number of scheduling queues, may be met. Additionally, Ethernet nodes configured for the use of service maps may interwork with legacy equipment, e.g., Ethernet switches that support eight scheduling classes, which scheduling classes have one possible drop precedence indication each (see the fifth exemplary service map 17000 in FIG. 17D). Advantageously, more than eight E-PHBs may be supported within an Ethernet network, through the use of multiple p-VLANs, each configured with different service maps. The use of Ethernet nodes configured for the use of service maps may be seen to simplify interworking between Ethernet services and IP/MPLS services. Both services use the similar and familiar concepts of IP DiffServ and MPLS DiffServ standards. Furthermore, interworking between different E-DiffServ domains is possible, through a mapping function at a boundary between the E-DiffServ domains.

As will be apparent to a person of skill in the art to which this application pertains, the use of service maps to define p-VLANs is applicable to provider networks and to enterprise networks. Additionally, the use of service maps to define p-VLANs is applicable to networks using the emerging Metro Ethernet Forum (MEF) standards.

For a v-VLAN, a single scheduling class is supported per VLAN. As such, the scheduling class for a received Ethernet frame is determined from the VLAN-ID (see the VLAN-ID field 1518 of the typical Ethernet frame 1500 in FIG. 15) of the received Ethernet frame. To support multiple scheduling classes, multiple v-VLANs are required. The provision of v-VLANs offers advantages including a stronger QoS guarantee, segregation of traffic in a given scheduling class, ability of performing selective per-scheduling class protection, and easier mapping to other networks/protocols that support a single Class of Service per connection (such as ATM, FR and MPLS L-LSP). Since an E-PHB is considered to be made up of a scheduling class and a drop precedence and a given v-VLAN may have only one scheduling class, the E-PHB determined, from the p-bits, for a given Ethernet frame effectively provides a drop precedence. Ideally, a fixed and universal mapping is used for the purpose of determining drop precedence from p-bits. Such a fixed and universal mapping may be seen to result in reduced configuration and signaling messages and less operations effort.

As with the service maps for p-VLANs, the scheduling class for a given v-VLAN may be pre-configured or signaled to other nodes/networks. If bandwidth profiles are implemented, only one bandwidth profile may be specified for each v-VLAN.

Figures 18A, 18B:
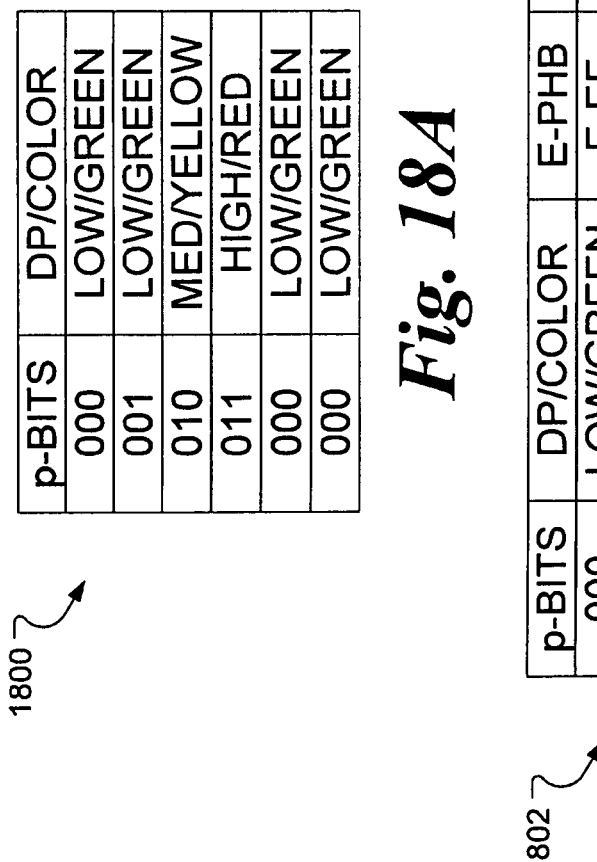
FIG. 18A illustrates a first exemplary p-bit to DiffServ-based treatment mapping for a v-VLAN according to an embodiment of the present invention.
FIG. 18B illustrates an expanded mapping of the p-bit to DiffServ-based treatment mapping of FIG. 18A according to an embodiment of the present invention.

FIG. 18A illustrates a p-bit to drop precedence indication map 1800 for use in a network employing v-VLANs. The p-bits of a received Ethernet frame may be used, in conjunction with the p-bit to drop precedence indication map 1800 to determine drop precedence for the received Ethernet frame. A universal, or fixed, p-bit to drop precedence indication map may be applied across an entire network. Preferably, the p-bit to drop precedence indication map may be standardized, to allow for multi-vendor interoperability.

To provide context for the p-bit to drop precedence indication map 1800 of FIG. 18A, an expanded mapping 1802 is illustrated in FIG. 18B. In the expanded mapping 1802, while p-bit value "000" corresponds to a low drop precedence associated with scheduling classes E-EF, CS-n AND E-DF, three separate p-bit values correspond to the scheduling class E-AFn. In particular, for the E-AFn scheduling class, p-bit value "001" corresponds to a low drop precedence, p-bit value "010" corresponds to a medium drop precedence and p-bit value "011" corresponds to a high drop precedence.

The expanded mapping 1802 may be considered to be similar to an "Encaps to PHB" mapping for MPLS L-LSPs, as disclosed in RFC 3270.

As will be clear to a person skilled in the art, other p-bit to drop precedence indication maps are possible.

As should be clear, each v-VLAN may be configured to be associated with a scheduling class (PSC), such as EF, AF3, AF2, DF, CS5. The PSC associated with a v-VLAN identified in a given Ethernet frame in combination with p-bits in the header of the given Ethernet frame may be used to determine the E-PHB to be used for forwarding the given Ethernet frame according to fixed mapping rules.

At the source of an Ethernet frame in an Ethernet network employing v-VLANs, the VLAN type (p or v) may first be established. Where the VLAN is of the v-VLAN type, the scheduling class of the v-VLAN may then be communicated to other network nodes using configuration or signaling means. The v-VLAN scheduling class may be used in combination with the Ethernet frame p-bits to determine the frame PHB and forwarding treatment through the network. Example p-bit maps are presented in FIGS. 19A, 19B, 19C and 19D for different v-VLAN scheduling classes and frame p-bits indications. Where the Ethernet frame is to be associated with the E-EF scheduling class, a p-bit map 1900A in FIG. 19A indicates that the p-bit value should be "000". Where the Ethernet frame is to be associated with the E-AF4 scheduling class, a p-bit map 1900B in FIG. 19B indicates that the p-bit value should be "001" for E-AF41, "010" for E-AF42 and "011" for E-AF43. Where the Ethernet frame is to be associated with the E-OF scheduling class, a p-bit map 1900C in FIG. 19C indicates that the p-bit value should be "000". Where the Ethernet frame is to be associated with the CS-4 scheduling class, a p-bit map 1900D in FIG. 19D indicates that the p-bit value should be "000".

Note that a specific p-VLAN implementation could be used to emulate a v-VLAN, by supporting a single scheduling class, and using the p-bits for indication of drop precedence. Such a specific p-VLAN implementation may be desirable for software simplification in that a single implementation could support both p-VLAN behavior and v-VLAN behavior.

Conveniently, p-VLANs and v-VLANS may be employed in all Ethernet network types, conventional and future, including connectionless networks, connection-oriented networks and path-oriented networks.

As discussed, conventional Ethernet networks use auto learning to configure forwarding tables in Ethernet switches. They may configure the DiffServ information on every switch per port, per interface card, per network node, per network segment or per whole network.

Future connection-oriented Ethernet networks (such as those disclosed herein) may be able to specify DiffServ information per VLAN using signaling or configuration. The future connection-oriented Ethernet networks are expected to include point-to-point, point-to-multipoint, multipoint-to-point and multipoint-to-multipoint connection options. Signaling may be carried out in a distributed fashion by the Ethernet switches, by separate controllers or by a network management system. Connection information would also include the explicit route and may, optionally, include the connection bandwidth and other QoS attributes.

In an Ethernet network, such as described herein, which use a control plane to set up connections with differential forwarding, an Ethernet switch may forward frames based on a combination of a globally unique MAC destination address and an 802.1q VLAN-ID. The forwarding tables at the Ethernet switch may be populated by the control plane using distributed signaling, centralized signaling or other configuration methods. The DiffServ QoS information represented by the p-bits may be added to the connection setup information to improve the QoS capabilities of connections.

Future path-oriented Ethernet networks are also envisaged, which may be set-up automatically by the network using a signaling protocol together with the underlying network routing protocol information. An example would mimic the MPLS LDP protocol. The network may implement multipoint-to-point Ethernet connectionless paths. But the signaling protocol could be used for communicating a path type (p/v VLAN) and DiffServ mapping information (see FIG. 17 for p-VLAN example maps that would be signaled. For v-VLAN, the scheduling class would be signaled using DiffServ terminology).

Figure 20:
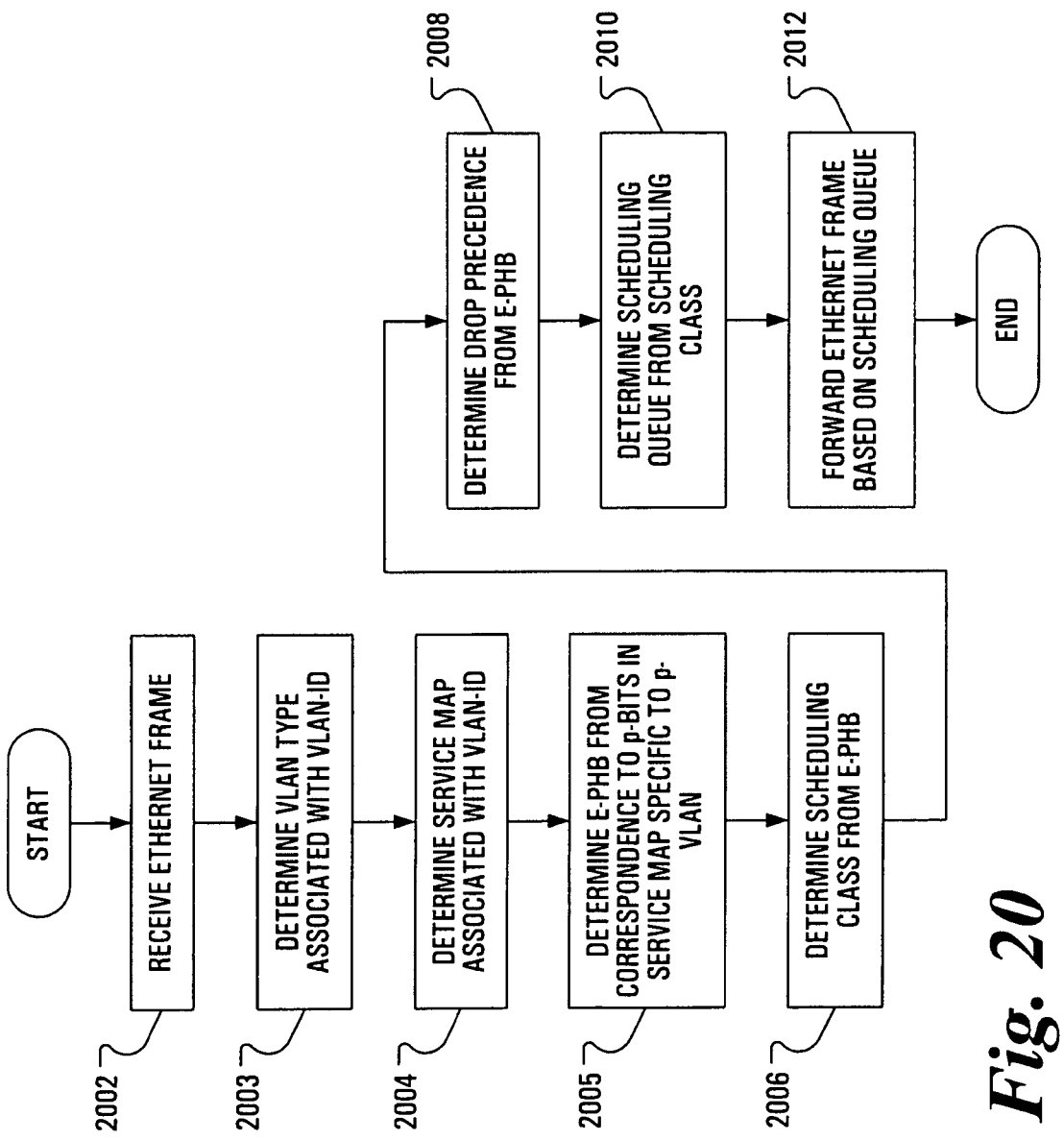
FIG. 20 illustrates steps of an exemplary traffic management method executed at an Ethernet node in an Ethernet network employing p-VLANs according to an embodiment of the present invention.

FIG. 20 illustrates steps of an exemplary traffic management data plane method executed at an Ethernet node in an Ethernet network employing p-VLANs. Initially, an Ethernet frame is received (step 2002). The VLAN type that is associated with the VLAN-ID that is identified in the Ethernet frame may then be determined (step 2003). For example, we may assume that the received Ethernet frame is associated with a p-VLAN. Subsequently, the service map associated with the VLAN-ID may be determined (step 2004). Next, an E-PHB may be determined (step 2005) for the Ethernet frame from a correspondence to the p-bits in the Ethernet frame in the service map associated with the particular p-VLAN. A scheduling class may then be determined (step 2006) for the Ethernet frame, based on the E-PHB. Additionally, a drop precedence may be determined (step 2008) for the Ethernet frame, based on the E-PHB. A scheduling queue may then be determined (step 2010) for the Ethernet frame, based on the scheduling class. The Ethernet node may then forward the Ethernet frame (step 2012) based on the scheduling queue and the drop precedence.

Figure 21:
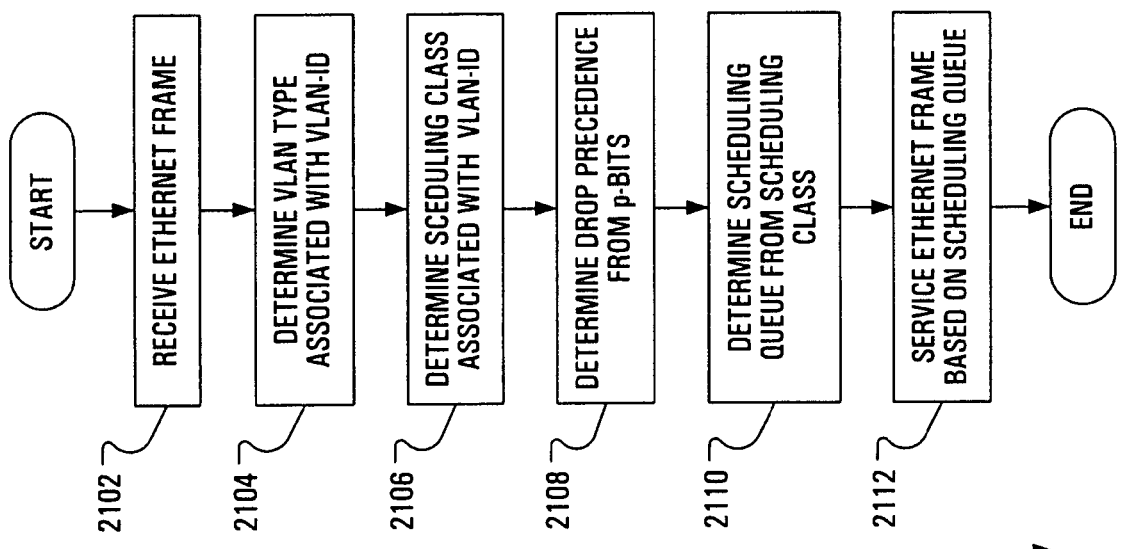
FIG. 21 illustrates steps of an exemplary traffic management method executed at an Ethernet node in an Ethernet network employing v-VLANs according to an embodiment of the present invention.

FIG. 21 illustrates steps of an exemplary traffic management data plane method executed at an Ethernet node in an Ethernet network employing v-VLANs. Initially, an Ethernet frame is received (step 2102). The VLAN type that is associated with the VLAN-ID that is identified in the Ethernet frame may then be determined (step 2104). A scheduling class may then be determined (step 2106) for the Ethernet frame, associated with the VLAN-ID of the Ethernet frame. Additionally, a drop precedence may be determined (step 2108) for the Ethernet frame, based on the p-bits encoded in the Ethernet frame. A scheduling queue may then be determined (step 2110) for the Ethernet frame, based on the scheduling class. The Ethernet node may then forward the Ethernet frame (step 2112) based on the scheduling queue and the drop precedence, if applicable.

FIGS. 22 through 28 present various scenarios wherein VLANs of the two different types may be employed.

Figure 22:
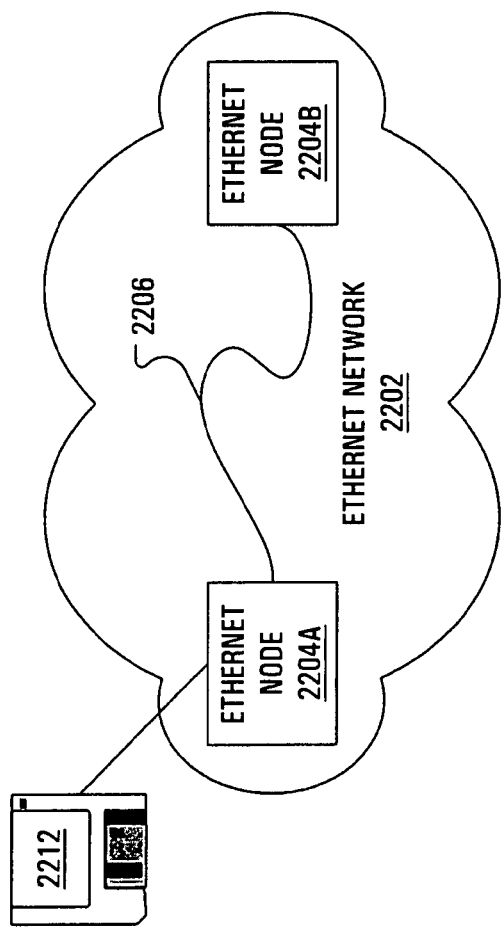
FIG. 22 illustrates a scenario representative of an enterprise network carrying multiple classes of traffic.

In FIG. 22, a first Ethernet node 2204A connects to a second Ethernet node 2204B (collectively or individually 2204) within an Ethernet network 2202 over a p-VLAN 2206. In the scenario of FIG. 22, which may be considered to be representative of an enterprise network carrying multiple classes of traffic (voice, data, etc.), the p-VLAN 2206 may traverse many intermediate Ethernet nodes (not shown) and may be configured or signaled to support up to eight scheduling classes (e.g., CS-7, . . . , CS-0) and a single drop precedence.

The Ethernet nodes 2204 may be loaded with data frame handling software for executing methods exemplary of this invention from a software medium 2212 which could be a disk, a tape, a chip or a random access memory containing a file downloaded from a remote source. As will be apparent to a person of ordinary skill however, data frame handling exemplary of this invention may be implemented in hardware, firmware or combinations of hardware, firmware and software. For instance, aspects of the invention may be implemented using a network processing unit or field programmable gate arrays (FPGAs).

Figure 23:
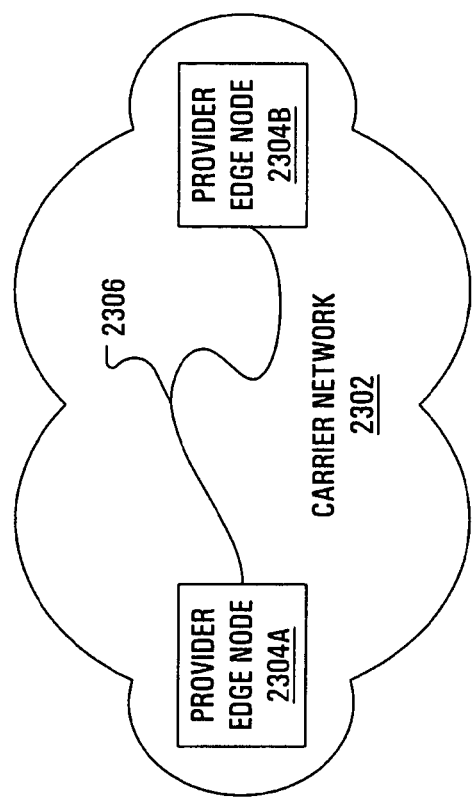
FIG. 23 illustrates a scenario representative of a carrier network carrying multiple classes of traffic with multiple drop precedence indications.

In FIG. 23, a first provider edge node 2304A connects to a second provider edge node 2304B within a carrier network 2302 over a p-VLAN 2306. In the scenario of FIG. 23, which may be considered to be representative of a carrier network carrying multiple classes of traffic with multiple drop precedence indications, the p-VLAN 2306 may be configured or signaled to support combinations of scheduling class and drop precedence (e.g., EF, AF41, AF42, AF43, AF31, AF32, AF33, DF).

Figure 24:
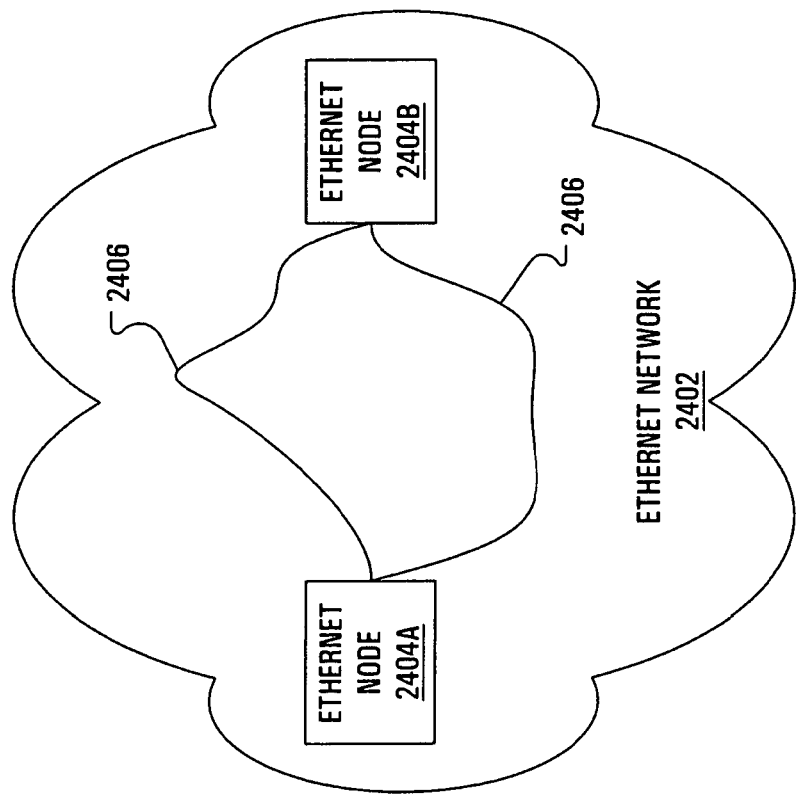
FIG. 24 illustrates a scenario representative of an enterprise network carrying two classes of traffic.

In FIG. 24, a first Ethernet node 2404A connects to a second Ethernet node 2404B within an Ethernet network 2402 over a first v-VLAN 2406 and a second v-VLAN 2408. In the scenario of FIG. 24, which may be considered to be representative of a network carrying two classes of traffic (e.g., voice and data), the first v-VLAN 2406 may be configured to support the voice traffic class and the second v-VLAN may be configured to support the data traffic class. By assigning voice class traffic and data class traffic to separate v-VLANs, benefits such as segregation, enhanced QoS, and the option of using different routes and protection strategies (e.g., using multiple spanning trees) for each v-VLAN may be realized.

Figure 25:
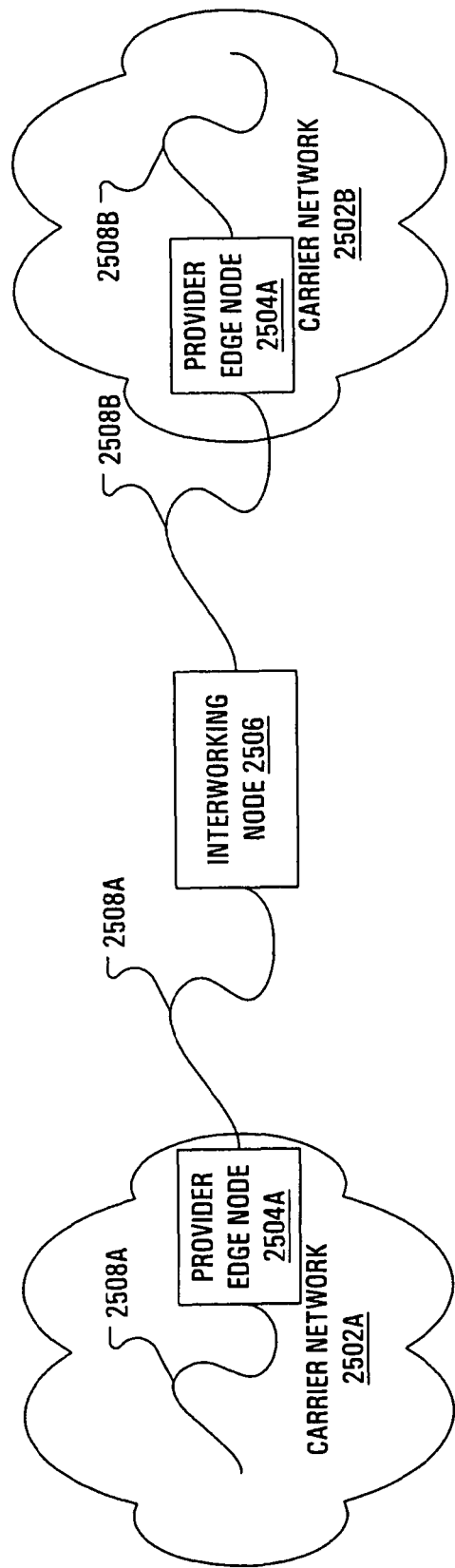
FIG. 25 illustrates a scenario representative of a Network-to-Network Interface (NNI) requiring mapping between multiple DiffServ domains.

In FIG. 25, a first provider edge node 2504A in a first carrier network 2502A connects to a second provider edge node 2504B in a second carrier network 2502B via an interworking node 2506. The first provider edge node 2504A connects to the interworking node 2506 over a first p-VLAN 2508A and the second provider edge node 2504B connects to the interworking node 2506 over a second p-VLAN 2508B.

In the scenario of FIG. 25, which may be considered to be representative of a NNI requiring mapping between multiple DiffServ domains, the first p-VLAN 2508A may be considered to be associated with a service map that maps p-bits valued at "000" to the EF scheduling class and maps p-bits valued at "001" to the AF41 scheduling class. In contrast, the second p-VLAN 2508B may be considered to be associated with a service map that maps p-bits valued at "110" to the AF31 scheduling class and maps p-bits valued at "001" to the AF21 scheduling class.

As such, the interworking node 2506 may be configured to perform class mapping, mapping the EF scheduling class traffic of the first p-VLAN 2508A aAF3 scheduling class traffic in the second p-VLAN 2508B. Additionally, the interworking node 2506 may be required to perform class mapping, mapping the AF4 scheduling class traffic of the first p-VLAN 2508A to the AF2 scheduling class traffic in the second p-VLAN 2508B.

The functions represented by the interworking node 2506 may be implemented in either the first provider edge node 2504A or the second provider edge node 2504B, or both. The mapping of one scheduling class to another may be part of a specification of the NNI or may be based on a bilateral agreement between the provider of the first carrier network 2502A and the provider of the second carrier network 2502B.

Figure 26:
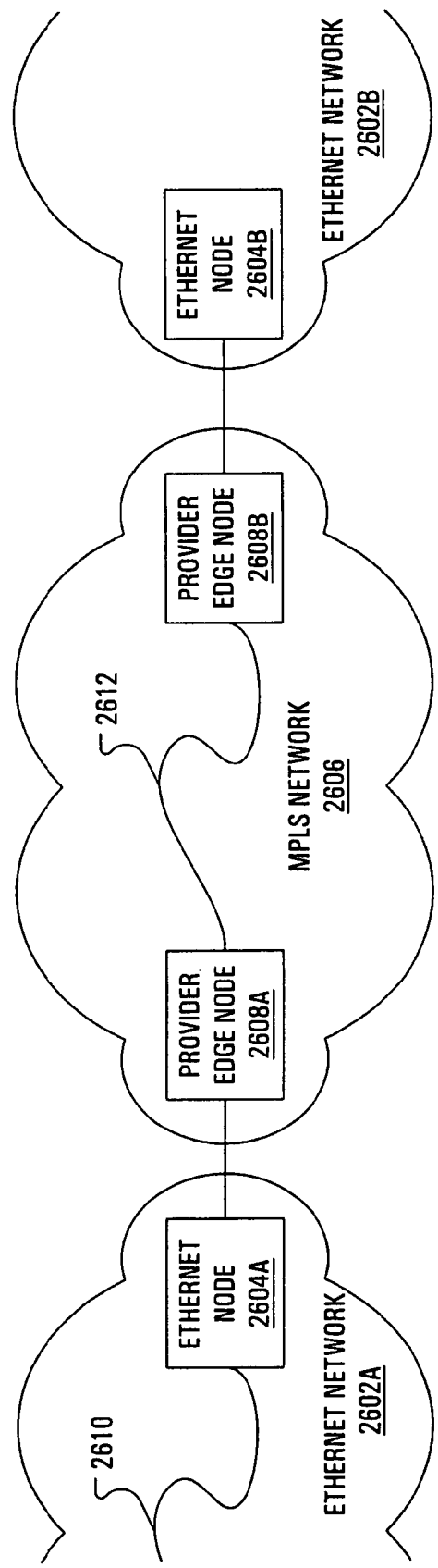
FIG. 26 illustrates a scenario representative of aspects of the present invention implemented in conjunction with layer 2 virtual private networks and an MPLS intermediate network.

In FIG. 26, a first Ethernet node 2604A associated with a first VLAN 2610 (which may be a p-VLAN or a v-VLAN) in a first Ethernet network 2602A connects to a first provider edge node 2608A within an MPLS network 2606. The first provider edge node 2608A connects over a connection 2612 to a second provider edge node 2608B within the MPLS network 2606. Where the MPLS network 2606 employs MPLS, the connection 2612 between the first provider edge node 2608A and the second provider edge node 2608B may be an E-LSP or an L-LSP. The second provider edge node 2608B connects to a second Ethernet node 2604B in a second Ethernet network 2602B.

The scenario of FIG. 26, which may be considered to be representative of aspects of the present invention implemented in conjunction with layer 2 virtual private networks, presents an example of a scenario requiring mapping between, say, a p-VLAN and a MPLS E-LSP. In particular, the first provider edge node 2608A may be configured with a mapping of PHBs used in the first Ethernet network 2602A to equivalent, or nearest, MPLS PHBs used in the MPLS network 2606. Similarly, the second provider edge node 2608B may be configured with a mapping of PHBs used in the MPLS network 2606 to equivalent, or nearest, PHBs used in the second Ethernet network 2602B. The mappings at both the Ethernet nodes 2602A, 2602B and the provider edge nodes 2608A, 2608B may indicate p-bits and EXP bits. The bandwidth of the p-VLAN can be mapped to the E-LSP bandwidth parameter. Similar mappings can take place between a v-VLAN and an L-LSP of equivalent class of service and bandwidth parameters. Note that VLAN to LSP mappings are greatly simplified because of the adoption of MPLS DiffServ methods to Ethernet networks proposed in this invention.

Figure 27:
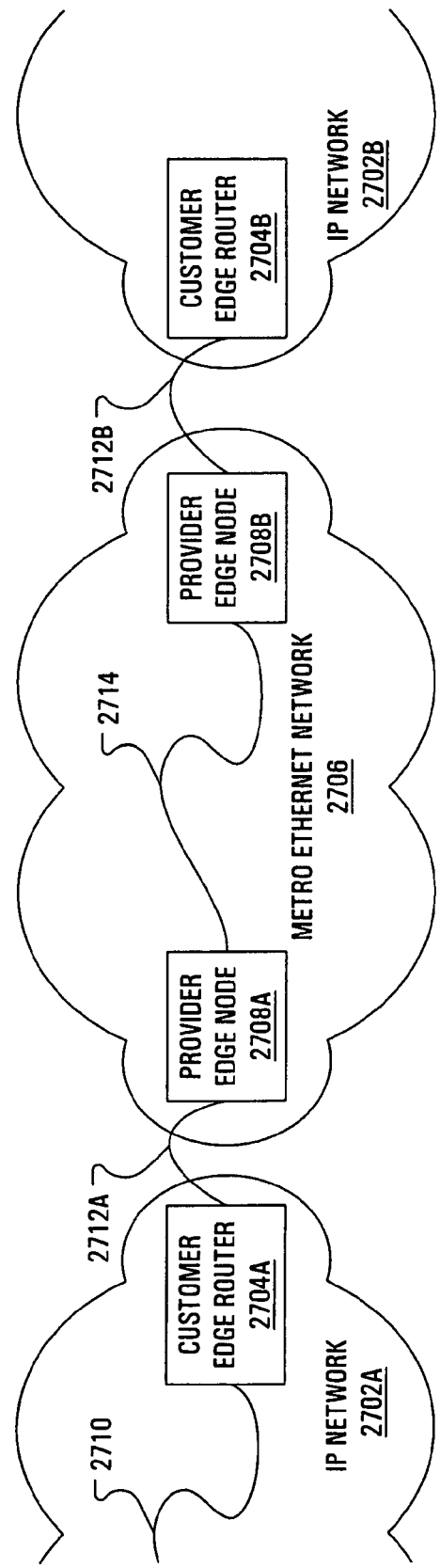
FIG. 27 illustrates a scenario similar to the scenario of FIG. 26, wherein the customer network is IP-based and the intermediate network is a Metro Ethernet Network.

In FIG. 27, a first customer edge router 2704A in a first IP network 2702A receives traffic over a link 2710, where the traffic includes IP packets specifying DiffServ Code Points (DSCP). The first customer edge router 2704A connects, over a first p-VLAN 2712A, to a first provider edge node 2708A within a Metro Ethernet Network (MEN) 2706. The first provider edge node 2708A connects over an Ethernet Virtual Connection 2714 to a second provider edge node 2708B within the MEN 2706. The second provider edge node 2708B connects, over a second p-VLAN 2712B, to second customer edge router 2704B in a second IP network 2702B.

The scenario of FIG. 27 may be considered to be representative of aspects of the present invention implemented in conjunction with mapping between layer 3 IP Class of Service indications (DSCP) and layer 2 Ethernet scheduling classes. In particular, the first customer edge router 2604A may be configured with a service map to allow mapping of DSCP used in the first IP network 2702A to scheduling classes used in the MEN 2706. The use of service maps and p-VLANs 2712A, 2712B, as described above, may be seen to simplify mapping between IP OSCP and Ethernet scheduling classes. Additionally, such a mapping may appear flexible. For instance, up to 64 DSCP may be mapped to eight p-VLAN PHBs with corresponding scheduling classes. Multiple p-VLANs may be used with different service maps, if more than eight PHBs need to be supported within the MEN 2706.

To coordinate traffic management, the MEF has defined (in the current MEF Technical Specification "Ethernet Service Model, Phase 1", available from http://www.metroethernet-forum.org/ www dot metroethernetforum dot org) a term "Class of Service Identifier", or CoS-IO, for information derivable from an Ethernet frame that allows the identification of a required Class of Service treatment of the Ethernet frame. The MEF has described the derivation of the CoS-IO from the identification of an Ethernet Virtual Connection (EVC-10) alone or from the EVC-10 in combination with the p-bits from the user priority field of the IEEE 802.1Q tag. The CoS-IO of an Ethernet frame may be used when determining a bandwidth profile and forwarding treatment. The option also exists for specifying a single bandwidth profile for all traffic to be transmitted over a given EVC.

Figure 28:
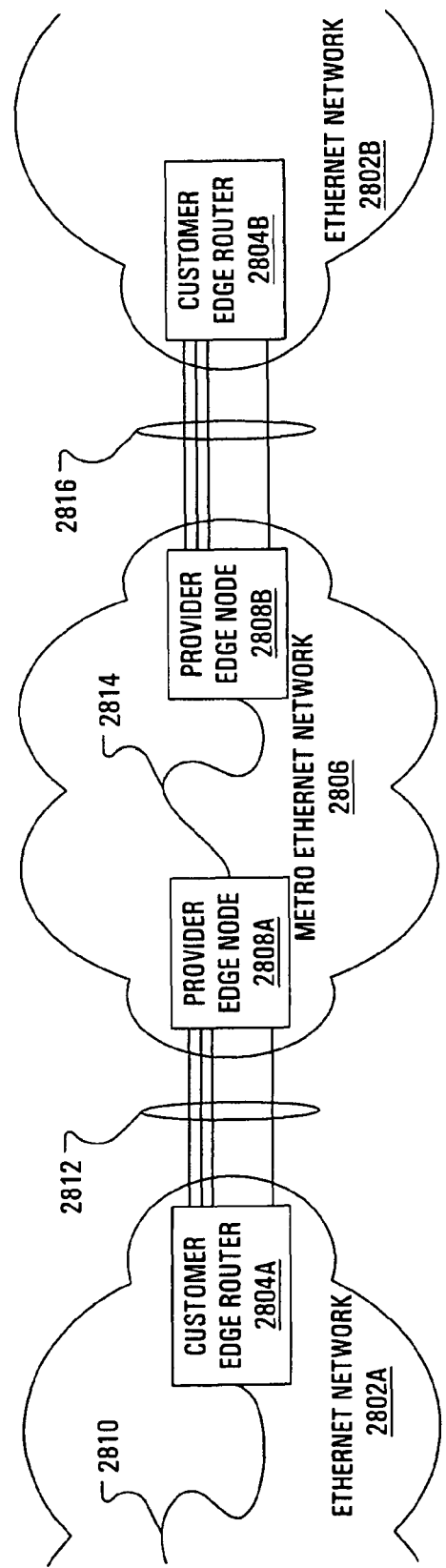
FIG. 28 illustrates a scenario similar to the scenario of FIG. 27, wherein customer network is Ethernet-based and several VLANS connect customer edge equipment to provider edge equipment.

In FIG. 28, a first customer edge router 2804A in a first Ethernet network 2802A receives traffic over a fink 2810. The first customer edge router 2804A connects, over a first combination of VLANs 2812, to a first provider edge node 2808A within a MEN 2806. The first provider edge node 2808A connects over an EVC 2814 to a second provider edge node 2808B within the MEN 2806. The second provider edge node 2808B connects, over a second combination of VLANs 2816, to second customer edge router 2804B in a second Ethernet network 2802B.

Aspects of the present invention provide enhanced mapping flexibility at the first provider edge node 2808A and allow the EVC 2814 to support up to 64 PHBs (e.g., by using eight p-VLANs with different service maps).

The first combination of VLANs 2812 that connect the first customer edge router 2804A to the first provider edge node 2808A may be comprised of any combination of p-VLANs and v-VLANs. The service map for each VLAN may be configured to indicate the relationship between the p-bits (in the case of p-VLAN) or VLAN-ID (in the case of v-VLAN) and the CoS-IO and drop precedence of a received Ethernet frame. Different service maps may be specified for the different customer VLANs.

The MEF has specified many traffic management techniques and service models. The traffic management techniques and service model definitions include single/multiple bandwidth profiles and single/multiple forwarding treatments that may be associated with an Ethernet frame after the Ethernet frame is processed according to the relevant service map.

Advantageously, the service maps defined for specific p-VLANs provide clarity to scheduling class configuration. The combination of Ethernet DiffServ semantics together with aspects of the present invention may be seen to result in universally understood and unambiguous CoS definitions (regarding frame scheduling treatment and drop precedence). It should be apparent to a person skilled in the art universally understood and unambiguous CoS definitions simplify planning and operations, reduce configuration errors and enhance equipment interoperability, compared with current table-based p-bit maps.

Furthermore, aspects of the present invention may be seen to provide a large degree of CoS flexibility. The service maps may be flexibly defined per-p-VLAN and a single or multiple scheduling classes per-VLAN allows for trade-offs between scalability and performance. Aspects of the present invention allow the Ethernet network administrator to specify the mappings of Ethernet DiffServ Behavior Aggregates (BAs) to one or more VLANs that best match the scheduling class of the BA and protection objectives.

Aspects of the present invention provide the ability of supporting more than eight PHBs in a MEN or other "single Admin" domain. Such support is made possible by using multiple VLANs of different types (v or p-VLANs, and service maps).

The service maps to be associated with p-VLANS and the scheduling class of v-VLANs may be configured, but it should be clear that this information may be signaled per VLAN between the switching nodes along the network path.

Further advantageously, the scope of aspects of the present invention encompasses applicability to Ethernet networks that support VLANs and QoS, enterprise networks, carrier networks and equipment, networks supporting the MEF specifications. Additionally, aspects of the present invention are applicable at both a User-Network-Interface (UNI) and a NNI.

It has been described above how connections may be established over a meshed Ethernet carrier network through configuring forwarding tables in network nodes and how data may be forwarded over those connections. The reader will appreciate that connections may be removed by deleting the configuration data from every node over which the connection was established. It is important that all such configuration data is removed to avoid network failure or inefficiency. The default behavior of Ethernet switches on receiving a frame addressed to an unknown destination (i.e., where there is no forwarding state configured for that destination address) is to broadcast the frame out on all output ports. In simply-connected networks, this behavior is appropriate. However, with a meshed topology, this behavior can be catastrophic. Through partial removal of connections (in particular where configuration data is left at ingress points of a connection but deleted at points further along the connections towards or including the egress point), it remains possible that Ethernet frames for the PE may enter the network but arrive at a point where there is no configuration data for forwarding them, resulting in undesirable broadcast behavior. Furthermore, partial removal of connections may leave forwarding loops configured by accident.

One solution to the problem of partial removal of connections is to alter the behavior of the Ethernet switches forming the carrier network so that, instead of broadcasting unknown traffic, the Ethernet switches discard packets and possibly issue an alarm, log or count the discarded packets. However, altering the basic behavior of Ethernet switches may require a hardware modification. While possible, this is not preferable. However, conventional Ethernet switches generally provide a software configurable function called rate limitation. Preferably, at all or most switches of the carrier network rate limitation is used to set a rate of zero, or a low rate if zero is not possible, for broadcast traffic including broadcast-on-unknown traffic.

Where this is not possible, other pre-emptive approaches to minimizing the problems of partial removal of connections may be used. One approach is to use block lists otherwise known as access control lists or ACLs. Conventional Ethernet switches provide a block list (typically of limited length) which may be used to specify certain destination MAC addresses such that received Ethernet frames addressed to these blocked address will be discarded without forwarding. By blocking, at all or most nodes of the network, the MAC addresses of many (but not all) MAC addresses of provider edge nodes, it is possible to minimize the potential dangers of partial removal of connections without over restricting the carrier's flexibility in establishing connections across the network. Notably, it is necessary to block different MAC addresses at different nodes of the network. Typically, at a given node, the block list will include only the MAC address for provider edge nodes to which no connections are likely to be established through that node. This approach is not easily scalable with large networks (the limited number of entries in block lists may be exhausted by large numbers of provider edge nodes). However, note that, to prevent loops it is only necessary to block rogue frames at one node in any loop.

Thus, it is possible to "spread" the blocked destination addresses more thinly across the network and still provide a degree of protection from loops thereby making more efficient use of the limited capacity of block lists.

While it is the use of VLAN tags in aspects of the present invention that enables flexibility in establishing connections across the network, the failure to remove connection state fully leaves the potential for looping of traffic. In particular, the problem will arise wherein a logical loop is left configured for any single given VLAN tag, i.e., the output ports of nodes defining a physical loop are left configured with membership of any single VLAN tag. Thus, another pre-emptive approach to minimizing the problems of partial removal of connections is to allocate connections to or from neighboring or nearby provider edge nodes using mutually exclusive VLAN tag pools. Thus, for example all connections to or from provider edge node PE1 will be guaranteed to have a different VLAN tag to those to or from neighboring provider edge node PE2. In this way, loops including both PE1 and PE2 cannot accidentally be formed through the partial removal of connections since by definition any state left configured in PE1 and PE2 will use different VLAN tags. This approach may be generalized by allocating connections to or from n adjacent provider edge nodes using n mutually exclusive VLAN tag pools. n is chosen to be sufficiently large to segregate use of VLAN tag pools as much as possible while providing sufficient flexibility in connection establishment to or from any particular provider edge node (bearing in mind that there are only 4094 possible VLAN tags). With smaller carrier networks, it may be possible for each provider edge node to use a different VLAN tag pool. However, with larger carrier networks it will be necessary to re-use VLAN tag pools at topologically distant provider edge nodes, otherwise flexibility in connection establishment will be compromised though VLAN tag pools being too small. A further embodiment that does not require manual administration is for each Ethernet device to pick a random starting point in the VLAN range for allocation.

It will be appreciated that combinations of the above approaches to minimizing the problems of partial removal of connections may be employed.

Mixed-mode networks may also be implemented. Mixed-mode networks are so called because they combine conventional Ethernet, 802.1q, or other forwarding modes, simultaneously with the connection-oriented forwarding mode present invention. In mixed-mode networks, part of the VLAN tag space (for example VLAN tags 1-2048) is assigned to conventional mode Ethernet forwarding and operates using a VLAN-aware spanning tree protocol and auto address learning. Another part of the VLAN tag space (for example VLAN tags 2049-4096) is assigned to connection-oriented mode Ethernet forwarding as described above. Note that the use of two or more such VLAN spaces creates logically separate forwarding mode networks over the same physical network. Forwarding state installed in Ethernet switches in one mode (for example, through auto address learning and spanning tree) is differentiable from forwarding state installed in Ethernet switches in another mode (for example, through control plane connection setup procedures according to the present invention) by having different VLAN tag spaces assigned. Thus, forwarding state in one mode, and mechanisms for installing or removing such forwarding state, do not affect forwarding of traffic in another mode and vice versa.

In mixed-mode Ethernet networks, preferably the connection-oriented Ethernet mode is given a higher forwarding priority than the conventional Ethernet mode so that QoS (in particular bandwidth and latency) may be guaranteed for connection-oriented Ethernet mode connections. This may be achieved through assigning a higher priority level to frames belonging to the connection-oriented Ethernet mode VLAN space using IEEE 802.1p strict priority, for example. Conventional Ethernet mode forwarding may then be offered as a best efforts service and may be used to allow customers guaranteed connections to burst over agreed bandwidth guarantees when overall network loading permits.

Another possible example of a mixed-mode Ethernet network would be to have one part of the VLAN tag space (for example, VLAN tags 1-1024) assigned to conventional mode Ethernet forwarding, another part (for example, VLAN tags 1025-2048) assigned to VLAN label switching (as described in draft-kawakami-mpls-lsp-vlan-00 dot txt, for example) and another part (for example, VLAN tags 2049-4096) assigned to connection-oriented mode Ethernet forwarding as described above. Advantageously, control plane metrics may be "leaked" (i.e., purposefully communicated) between different forwarding modes so that, for example, spanning tree converges on virtual topologies that will avoid heavily loaded links primarily utilizing the connection-oriented mode. This is in addition to the use of priority described above to mitigate resource collisions between modes.

While embodiments have been described above with reference to the use of VLAN tags for enabling flexibility in establishing and differential forwarding of data traffic associated with different connections, the reader will appreciate that other tags or identifiers may be used. For example, MPLS labels may be used. In this case, the MPLS labels are appended, pre-pended or inserted into the Ethernet frames and Ethernet switches in the network forward based on a combination of Ethernet destination address and MPLS label. Note, that this is entirely different to conventional use of MPLS labels since the MPLS labels are not used for label switching.

Also, while embodiments have been described above with reference to Ethernet networks and Ethernet frames, those skilled in the art will appreciate that the present invention applies in general to any frame-based, packet-based or cell-based switching network whether at OSI layer-2 or layer 3 network. And to data structures including frames, packets and cells. In the following claims, the term frame-based network, or cognate terms, shall denote any such switching network and the term frame, or cognate terms, shall denote any such data structure. For example, IP networks comprising a mesh of IP routers may be used to route IP packets. Conventional Open Shortest Path Forwarding (OSPF) control plane mechanisms would be disabled to allow direct configuration of forwarding or routing tables. In this case, the routers may be configured to route on a combination of IP destination address and VLAN tags, MPLS labels, DiffServ Code Points, IPv6 flow labels, type of service, traffic class or other such fields, or optional fields added specifically to act as identifiers. This is of particular interest where IP/IP, IP/MPLS and Pseudo Wire/IP or similar forms of encapsulation are used in order to maintain customer separation over this forwarding layer.

It will also be appreciated that addresses other than destination address may be used in combination with a qualifying identifier to enable differential forwarding according to the present invention and thereby to enable the establishment of connections. In particular, forwarding may be performed on the basis of a source address of data frame corresponding to a source node. Furthermore, forwarding may be performed on the basis of any address field contained in a data frame or specifically added to a data frame. Furthermore, differential forwarding may be performed on the basis of a combination of source and destination address, or on the basis of a single address field which can uniquely address a sufficiently large space of nodes and additionally can qualify the address to enable differential forwarding of data frames. The reader will appreciate that the methods described above may be implemented in the form of hardware or software operating on conventional data processing hardware.

Advantageously, two types of VLANs are provided. A given p-VLAN may be associated with a service map that provides association between p-bits and a DiffServ PHB. A given v-VLAN may be associated with a scheduling class and the p-bits may be used to determine drop precedence based on a fixed mapping.

For a p-VLAN, parameters include VLAN-type and service map, and may include bandwidth parameters. For a v-VLAN, parameters includes type and scheduling class, and may include bandwidth parameters. For both VLAN types, the parameters may be configured per interface, per node, per segment, per network, etc. Additionally, the parameters may be configured for all types of VLANs: connectionless; connection-oriented; and path-oriented. Furthermore, the parameters may be signaled per VLAN in connection-oriented and path-oriented Ethernet networks.

Other modifications will be apparent to those skilled in the art and, therefore, the invention is defined in the claims.

We claim:

1. A method of forwarding frames associated with a virtual local area network (VLAN) in a data network, the method comprising:
   providing a service map for a VLAN to nodes of the data network, the service map defining a mapping between predetermined contents of a user priority field in a header of each frame and selected ones of a set of per hop behaviours controlling a forwarding treatment of frames; and
   at each node having the service map, associating the service map with a virtual local area network identifier (VLAN-ID) of the VLAN such that each node forwards frames including the VLAN-ID in accordance with the service map.

2. The method of claim 1, wherein the service map comprises a mapping between each per hop behaviour and a respective frame scheduling class.

3. The method of claim 1, wherein the service map comprises a mapping between each per hop behaviour and a respective frame drop precedence.

4. The method of claim 1, wherein the set of per hop behaviours comprises at least one of Expedited Forwarding, Assured Forwarding, Class Selector, and Best Effort.

5. The method of claim 1, comprising:
   providing another service map for another VLAN to the nodes of the data network; and
   at each node having the other service map, associating the other service map with a VLAN-ID of the other VLAN such that each node forwards frames including the VLAN-ID of the other VLAN in accordance with the other service map.

6. The method of claim 1, comprising:
   distributing a bandwidth profile associated with the VLAN to the nodes; and
   at each node, associating the bandwidth profile with the VLAN-ID of the VLAN such that each node forwards data frames including the VLAN-ID in accordance with the bandwidth profile.

7. The method of claim 1, comprising, at each node:
   receiving a data frame;
   determining the VLAN-ID associated with the data frame from a header of the data frame;
   based on the VLAN-ID, selecting a service map;
   determining a user priority associated with the data frame from the header of the data frame;
   determining a per hop behaviour for the data frame based on the selected service map and the user priority associated with the data frame; and
   forwarding the data frame based on the determined per hop behaviour.

8. The method of claim 7, wherein the data frame is an Ethernet frame.

9. The method of claim 8, wherein the header of the frame comprises an IEEE 802.1Q tag.

10. The method of claim 9, wherein the IEEE 802.1Q tag contains the VLAN-ID and the user priority associated with the data frame.

11. The method of claim 1, wherein the VLAN is connectionless.

12. The method of claim 1, wherein the VLAN is connection-oriented.

13. The method of claim 1, wherein the VLAN is path-oriented.

14. The method of claim 1, wherein the service map is associated with a plurality of VLAN-Ids.

15. The method of claim 1, wherein the service map is associated with a particular network node.

16. The method of claim 1, wherein the service map is associated with a particular network segment.

17. The method of claim 1, wherein the service map is associated with a particular network.

18. The method of claim 1, wherein the service map is associated with a particular interface.

19. The method of claim 1, wherein the VLAN is a p-bits-inferred-scheduling class VLAN (p-VLAN).

20. The method of claim 1, comprising:
   establishing a path through the data network for the VLAN; and
   determining the service map for the VLAN;
   wherein providing the service map to the nodes of the data network comprises providing the service map to nodes on the path.

21. The method of claim 20, wherein providing the service map to nodes of the data network comprises signalling the service map from an edge node of the data network on the path to other nodes of the data network on the path.

* * * * *